United States Patent
Gardezi et al.

(10) Patent No.: US 11,743,290 B2
(45) Date of Patent: Aug. 29, 2023

(54) SYSTEM AND METHOD FOR DETECTING CYBERATTACKS IMPERSONATING LEGITIMATE SOURCES

(71) Applicant: FireEye, Inc., Milpitas, CA (US)

(72) Inventors: Muhammad Zain Ul Abadin Gardezi, Milpitas, CA (US); Mohsin Saeed, Lahore Punjab (PK); Hassan Ahmed, Lahore Punjab (PK); Fahim Abbasi, Auckland (NZ); Farrukh Shahzad, Lahore Punjab (PK)

(73) Assignee: FireEye Security Holdings US LLC, San Jose, CA (US)

( * ) Notice: Subject to any disclaimer, the term of this patent is extended or adjusted under 35 U.S.C. 154(b) by 669 days.

(21) Appl. No.: 16/725,674

(22) Filed: Dec. 23, 2019

(65) Prior Publication Data
US 2020/0252428 A1    Aug. 6, 2020

Related U.S. Application Data

(60) Provisional application No. 62/784,304, filed on Dec. 21, 2018.

(51) Int. Cl.
   *H04L 69/22*    (2022.01)
   *H04L 9/40*     (2022.01)

(52) U.S. Cl.
   CPC ...... *H04L 63/1483* (2013.01); *H04L 63/1416* (2013.01); *H04L 63/168* (2013.01); *H04L 69/22* (2013.01)

(58) Field of Classification Search
   USPC .......................................................... 726/23
   See application file for complete search history.

(56) References Cited

U.S. PATENT DOCUMENTS

| 6,898,632 B2 | 5/2005 | Gordy et al. |
| 6,941,348 B2 | 9/2005 | Petry et al. |

(Continued)

FOREIGN PATENT DOCUMENTS

| CA | 2840992 A1 * | 1/2013 | ............ G01F 11/262 |
| CN | 105074717 A * | 11/2015 | ........... G06F 21/563 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.

(Continued)

*Primary Examiner* — Sakinah White Taylor
(74) *Attorney, Agent, or Firm* — Rutan & Tucker, LLP

(57) ABSTRACT

A system and method for detecting phishing cyberattacks. The method involves parsing a code segment retrieved using a suspect uniform resource locator (URL) to identify any links included in the code segment. From these links, additional code segments may be recovered in accordance with a code segment recovery scheme. Thereafter, analytics are performed on the retrieved and possibly recovered code segments. The analytics include determining whether any of the code segments is correlated with a code segment associated with a known prior phishing cyberattack. Upon completing the analytics, an alert message including meta-information associated with results from the analytics is generated to identify that the URL is associated with a known prior phishing cyberattack when one or perhaps a combination of code segments associated with the URL are correlated to any code segment associated with a known prior phishing cyberattack.

21 Claims, 8 Drawing Sheets

(56) References Cited

U.S. PATENT DOCUMENTS

| | | |
|---|---|---|
| 7,080,407 B1 | 7/2006 | Zhao et al. |
| 7,080,408 B1 | 7/2006 | Pak et al. |
| 7,243,371 B1 | 7/2007 | Kasper et al. |
| 7,308,716 B2 | 12/2007 | Danford et al. |
| 7,448,084 B1 | 11/2008 | Apap et al. |
| 7,458,098 B2 | 11/2008 | Judge et al. |
| 7,467,408 B1 | 12/2008 | O'Toole, Jr. |
| 7,496,961 B2 | 2/2009 | Zimmer et al. |
| 7,519,990 B1 | 4/2009 | Xie |
| 7,540,025 B2 | 5/2009 | Tzadikario |
| 7,639,714 B2 | 12/2009 | Stolfo et al. |
| 7,698,548 B2 | 4/2010 | Shelest et al. |
| 7,779,463 B2 | 8/2010 | Stolfo et al. |
| 7,854,007 B2 | 12/2010 | Sprosts et al. |
| 7,937,387 B2 | 5/2011 | Frazier et al. |
| 7,949,849 B2 | 5/2011 | Lowe et al. |
| 8,006,305 B2 | 8/2011 | Aziz |
| 8,020,206 B2 | 9/2011 | Hubbard et al. |
| 8,045,458 B2 | 10/2011 | Alperovitch et al. |
| 8,069,484 B2 | 11/2011 | McMillan et al. |
| 8,171,553 B2 | 5/2012 | Aziz et al. |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,291,499 B2 | 10/2012 | Aziz et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,438,644 B2 | 5/2013 | Watters et al. |
| 8,464,340 B2 | 6/2013 | Ahn et al. |
| 8,494,974 B2 | 7/2013 | Watters et al. |
| 8,516,593 B2 | 8/2013 | Aziz |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,239 B2 | 11/2013 | Aziz et al. |
| 8,595,186 B1 * | 11/2013 | Mandyam .................. G06F 8/38 717/178 |
| 8,635,696 B1 | 1/2014 | Aziz |
| 8,689,333 B2 | 4/2014 | Aziz |
| 8,713,681 B2 | 4/2014 | Silberman et al. |
| 8,776,229 B1 | 7/2014 | Aziz |
| 8,793,278 B2 | 7/2014 | Frazier et al. |
| 8,793,787 B2 | 7/2014 | Ismael et al. |
| 8,813,050 B2 | 8/2014 | Watters et al. |
| 8,832,829 B2 | 9/2014 | Manni et al. |
| 8,850,571 B2 | 9/2014 | Staniford et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,015,846 B2 | 4/2015 | Watters et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,367,872 B1 * | 6/2016 | Visbal ............... G06F 16/24578 |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,749,343 B2 | 8/2017 | Watters et al. |
| 9,749,344 B2 | 8/2017 | Watters et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |

(56) References Cited

U.S. PATENT DOCUMENTS

| | | |
|---|---|---|
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,892,261 B2 | 2/2018 | Joram et al. |
| 9,904,955 B2 | 2/2018 | Watters et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,063,583 B2 | 8/2018 | Watters et al. |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,282,548 B1 | 5/2019 | Aziz et al. |
| 10,284,574 B1 | 5/2019 | Aziz et al. |
| 10,284,575 B2 | 5/2019 | Paithane et al. |
| 10,296,437 B2 | 5/2019 | Ismael et al. |
| 10,335,738 B1 | 7/2019 | Paithane et al. |
| 10,341,363 B1 | 7/2019 | Vincent et al. |
| 10,341,365 B1 | 7/2019 | Ha |
| 10,366,231 B1 | 7/2019 | Singh et al. |
| 10,380,343 B1 | 8/2019 | Jung et al. |
| 10,395,029 B1 | 8/2019 | Steinberg |
| 10,404,725 B1 | 9/2019 | Rivlin et al. |
| 10,417,031 B2 | 9/2019 | Paithane et al. |
| 10,430,586 B1 | 10/2019 | Paithane et al. |
| 10,432,649 B1 | 10/2019 | Bennett et al. |
| 10,445,502 B1 | 10/2019 | Desphande et al. |
| 10,447,728 B1 | 10/2019 | Steinberg |
| 10,454,950 B1 | 10/2019 | Aziz |
| 10,454,953 B1 | 10/2019 | Amin et al. |
| 10,462,173 B1 | 10/2019 | Aziz et al. |
| 10,467,411 B1 | 11/2019 | Pidathala et al. |
| 10,467,414 B1 | 11/2019 | Kindlund et al. |
| 10,469,512 B1 | 11/2019 | Ismael |
| 10,474,813 B1 | 11/2019 | Ismael |
| 10,476,906 B1 | 11/2019 | Siddiqui |
| 10,476,909 B1 | 11/2019 | Aziz et al. |
| 10,491,627 B1 | 11/2019 | Su |
| 10,503,904 B1 | 12/2019 | Singh et al. |
| 10,505,956 B1 | 12/2019 | Pidathala et al. |
| 10,511,614 B1 | 12/2019 | Aziz |
| 10,515,214 B1 | 12/2019 | Vincent et al. |
| 10,523,609 B1 | 12/2019 | Subramanian |
| 10,528,726 B1 | 1/2020 | Ismael |
| 10,534,906 B1 | 1/2020 | Paithane et al. |
| 10,552,610 B1 | 2/2020 | Vashisht et al. |
| 10,554,507 B1 | 2/2020 | Siddiqui et al. |
| 10,565,377 B1 * | 2/2020 | Zheng .................. G06F 21/563 |
| 10,565,378 B1 | 2/2020 | Vincent et al. |
| 10,567,405 B1 | 2/2020 | Aziz |
| 10,572,665 B2 | 2/2020 | Jung et al. |
| 10,581,874 B1 | 3/2020 | Khalid et al. |
| 10,581,879 B1 | 3/2020 | Paithane et al. |
| 10,581,898 B1 | 3/2020 | Singh |
| 10,587,636 B1 | 3/2020 | Aziz et al. |
| 10,587,647 B1 | 3/2020 | Khalid et al. |
| 10,592,678 B1 | 3/2020 | Ismael et al. |
| 10,601,848 B1 | 3/2020 | Jeyaraman et al. |
| 10,601,863 B1 | 3/2020 | Siddiqui |
| 10,601,865 B1 | 3/2020 | Mesdaq et al. |
| 10,616,266 B1 | 4/2020 | Otvagin |
| 10,621,338 B1 | 4/2020 | Pfoh et al. |
| 10,623,434 B1 | 4/2020 | Aziz et al. |
| 10,637,880 B1 | 4/2020 | Islam et al. |
| 10,642,753 B1 | 5/2020 | Steinberg |
| 10,657,251 B1 | 5/2020 | Malik et al. |
| 10,666,686 B1 | 5/2020 | Singh et al. |
| 10,671,721 B1 | 6/2020 | Otvagin et al. |
| 10,671,726 B1 | 6/2020 | Paithane et al. |
| 10,701,091 B1 | 6/2020 | Cunningham et al. |
| 10,706,149 B1 | 7/2020 | Vincent |
| 10,713,358 B2 | 7/2020 | Sikorski et al. |
| 10,713,362 B1 | 7/2020 | Vincent et al. |
| 10,715,542 B1 | 7/2020 | Wei et al. |
| 10,726,127 B1 | 7/2020 | Steinberg |
| 10,728,263 B1 | 7/2020 | Neumann |
| 10,735,458 B1 | 8/2020 | Haq et al. |
| 10,740,456 B1 | 8/2020 | Ismael et al. |
| 10,747,872 B1 | 8/2020 | Ha et al. |
| 10,757,120 B1 | 8/2020 | Aziz et al. |
| 10,757,134 B1 | 8/2020 | Eyada |
| 10,785,255 B1 | 9/2020 | Otvagin et al. |
| 10,791,138 B1 | 9/2020 | Siddiqui et al. |
| 10,795,991 B1 | 10/2020 | Ross et al. |
| 10,798,112 B2 | 10/2020 | Siddiqui et al. |
| 10,798,121 B1 | 10/2020 | Khalid et al. |
| 10,805,340 B1 | 10/2020 | Goradia |
| 10,805,346 B2 | 10/2020 | Kumar et al. |
| 10,812,513 B1 | 10/2020 | Manni et al. |
| 10,817,606 B1 | 10/2020 | Vincent |
| 10,826,931 B1 | 11/2020 | Quan et al. |
| 10,826,933 B1 | 11/2020 | Ismael et al. |
| 10,834,107 B1 | 11/2020 | Paithane et al. |
| 10,846,117 B1 | 11/2020 | Steinberg |
| 10,848,397 B1 | 11/2020 | Siddiqui et al. |
| 10,848,521 B1 | 11/2020 | Thioux et al. |
| 10,855,700 B1 | 12/2020 | Jeyaraman et al. |
| 10,868,818 B1 | 12/2020 | Rathor et al. |
| 10,872,151 B1 | 12/2020 | Kumar et al. |
| 10,873,597 B1 | 12/2020 | Mehra et al. |
| 10,887,328 B1 | 1/2021 | Paithane et al. |
| 10,893,059 B1 | 1/2021 | Aziz et al. |
| 10,893,068 B1 | 1/2021 | Khalid et al. |
| 10,902,117 B1 | 1/2021 | Singh et al. |
| 10,902,119 B1 | 1/2021 | Vashisht et al. |
| 10,904,286 B1 | 1/2021 | Liu |
| 10,929,266 B1 | 2/2021 | Goradia et al. |

(56) References Cited

U.S. PATENT DOCUMENTS

| | | |
|---|---|---|
| 11,070,579 B1* | 7/2021 | Kiernan .................. H04L 63/20 |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2003/0084318 A1 | 5/2003 | Schertz |
| 2003/0188190 A1 | 10/2003 | Aaron et al. |
| 2003/0191957 A1 | 10/2003 | Hypponen et al. |
| 2004/0015712 A1 | 1/2004 | Szor |
| 2004/0019832 A1 | 1/2004 | Arnold et al. |
| 2004/0117478 A1 | 6/2004 | Triulzi et al. |
| 2004/0117624 A1 | 6/2004 | Brandt et al. |
| 2004/0236963 A1 | 11/2004 | Danford et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0086523 A1 | 4/2005 | Zimmer et al. |
| 2005/0091513 A1 | 4/2005 | Mitomo et al. |
| 2005/0108562 A1 | 5/2005 | Khazan et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0238005 A1 | 10/2005 | Chen et al. |
| 2005/0262562 A1 | 11/2005 | Gassoway |
| 2005/0283839 A1 | 12/2005 | Cowburn |
| 2006/0010495 A1 | 1/2006 | Cohen et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0031476 A1 | 2/2006 | Mathes et al. |
| 2006/0070130 A1 | 3/2006 | Costea et al. |
| 2006/0117385 A1 | 6/2006 | Mester et al. |
| 2006/0123477 A1 | 6/2006 | Raghavan et al. |
| 2006/0150249 A1 | 7/2006 | Gassen et al. |
| 2006/0161987 A1 | 7/2006 | Levy-Yurista |
| 2006/0173992 A1 | 8/2006 | Weber et al. |
| 2006/0191010 A1 | 8/2006 | Benjamin |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0064689 A1 | 3/2007 | Shin et al. |
| 2007/0143827 A1 | 6/2007 | Nicodemus et al. |
| 2007/0157306 A1 | 7/2007 | Elrod et al. |
| 2007/0192858 A1 | 8/2007 | Lum |
| 2007/0208822 A1 | 9/2007 | Wang et al. |
| 2007/0240218 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2008/0005782 A1 | 1/2008 | Aziz |
| 2008/0040710 A1 | 2/2008 | Chiriac |
| 2008/0072326 A1 | 3/2008 | Danford et al. |
| 2008/0077793 A1 | 3/2008 | Tan et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0189787 A1 | 8/2008 | Arnold et al. |
| 2008/0307524 A1 | 12/2008 | Singh et al. |
| 2008/0320594 A1 | 12/2008 | Jiang |
| 2009/0003317 A1 | 1/2009 | Kasralikar et al. |
| 2009/0064332 A1 | 3/2009 | Porras et al. |
| 2009/0077383 A1* | 3/2009 | de Monseignat ..... H04L 9/3242 |
| | | 713/176 |
| 2009/0083855 A1 | 3/2009 | Apap et al. |
| 2009/0125976 A1 | 5/2009 | Wassermann et al. |
| 2009/0126015 A1 | 5/2009 | Monastyrsky et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0241190 A1 | 9/2009 | Todd et al. |
| 2009/0300589 A1 | 12/2009 | Watters et al. |
| 2010/0017546 A1 | 1/2010 | Poo et al. |
| 2010/0030996 A1 | 2/2010 | Butler, II |
| 2010/0058474 A1 | 3/2010 | Hicks |
| 2010/0077481 A1 | 3/2010 | Polyakov et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0281542 A1 | 11/2010 | Stolfo et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0099635 A1 | 4/2011 | Silberman et al. |
| 2011/0167493 A1 | 7/2011 | Song et al. |
| 2011/0173213 A1 | 7/2011 | Frazier et al. |
| 2011/0178942 A1 | 7/2011 | Watters et al. |
| 2011/0219450 A1 | 9/2011 | McDougal et al. |
| 2011/0225624 A1 | 9/2011 | Sawhney et al. |
| 2011/0247072 A1 | 10/2011 | Staniford et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0210423 A1 | 8/2012 | Friedrichs et al. |
| 2012/0222121 A1 | 8/2012 | Staniford et al. |
| 2012/0233698 A1 | 9/2012 | Watters et al. |
| 2012/0278886 A1 | 11/2012 | Luna |
| 2012/0331553 A1 | 12/2012 | Aziz et al. |
| 2013/0036472 A1 | 2/2013 | Aziz |
| 2013/0047257 A1 | 2/2013 | Aziz |
| 2013/0097706 A1 | 4/2013 | Titonis et al. |
| 2013/0185795 A1 | 7/2013 | Winn et al. |
| 2013/0227691 A1 | 8/2013 | Aziz et al. |
| 2013/0232577 A1 | 9/2013 | Watters et al. |
| 2013/0247186 A1 | 9/2013 | LeMasters |
| 2013/0282426 A1 | 10/2013 | Watters et al. |
| 2013/0291109 A1 | 10/2013 | Staniford et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0297494 A1 | 10/2014 | Watters et al. |
| 2014/0331321 A1* | 11/2014 | Witherspoon ...... H04L 63/0227 |
| | | 726/23 |
| 2014/0337836 A1 | 11/2014 | Ismael |
| 2014/0344926 A1 | 11/2014 | Cunningham et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0047032 A1* | 2/2015 | Hannis ................ H04L 63/1491 |
| | | 726/23 |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |

(56) References Cited

U.S. PATENT DOCUMENTS

| | | |
|---|---|---|
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0241580 A1 | 8/2016 | Watters et al. |
| 2016/0241581 A1 | 8/2016 | Watters et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0323295 A1 | 11/2016 | Joram et al. |
| 2016/0335110 A1 | 11/2016 | Paithane et al. |
| 2017/0034185 A1* | 2/2017 | Green ............... H04L 63/0227 |
| 2017/0070523 A1* | 3/2017 | Bailey ............... G06F 16/9535 |
| 2017/0083703 A1 | 3/2017 | Abbasi et al. |
| 2017/0195353 A1* | 7/2017 | Taylor ............... H04L 63/1425 |
| 2018/0013770 A1 | 1/2018 | Ismael |
| 2018/0048660 A1 | 2/2018 | Paithane et al. |
| 2018/0069891 A1 | 3/2018 | Watters et al. |
| 2018/0121316 A1 | 5/2018 | Ismael et al. |
| 2018/0288077 A1 | 10/2018 | Siddiqui et al. |
| 2019/0014141 A1* | 1/2019 | Segal ............... H04L 63/1483 |
| 2019/0104154 A1 | 4/2019 | Kumar et al. |
| 2019/0132334 A1 | 5/2019 | Johns et al. |
| 2019/0207966 A1 | 7/2019 | Vashisht et al. |
| 2019/0207967 A1 | 7/2019 | Vashisht et al. |
| 2019/0364061 A1* | 11/2019 | Higbee ............... H04L 63/1433 |
| 2020/0013124 A1* | 1/2020 | Obee ............... G06Q 40/08 |

FOREIGN PATENT DOCUMENTS

| | | |
|---|---|---|
| GB | 2439806 A | 1/2008 |
| GB | 2490431 A | 10/2012 |
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike , "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H. , et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C. , et al., "Honeycomb-Creating Intrusion Detection Signatures Using Honeypots", 2nd Workshop on Hot Topics in Networks (HotNets-11), Boston, USA, (2003).

(56) References Cited

OTHER PUBLICATIONS

Kristoff, J. , "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D. , et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt , "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D. , et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S. , et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham , "Insertion, Evasion, and Denial of Service: Eluding Network Intrusion Detection", Secure Networks, ("Ptacek"), (Jan. 1998).

Venezia, Paul , "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

* cited by examiner

SYSTEM AND METHOD FOR DETECTING CYBERATTACKS IMPERSONATING LEGITIMATE SOURCES

CROSS-REFERENCE TO RELATED APPLICATIONS

This application claims the benefit of priority on U.S. Provisional Application No. 62/784,304, filed Dec. 21, 2018, the entire contents of which are incorporated herein by reference.

FIELD

Embodiments of the disclosure relate to cyber security. More particularly, embodiments of the disclosure related to a system and method for mitigating false negatives and false positives in detection of cyberattacks involving the impersonation of a legitimate source such as a phishing cyberattack.

GENERAL BACKGROUND

Over the past decade, cyberattacks directed to impersonating legitimate sources, such as phishing cyberattacks, have become a problem experienced by many users of the Internet. Phishing is a fraudulent attempt to obtain sensitive information from targets by disguising requests as being from a trustworthy (legitimate) entity. A phishing cyberattack can entail the transmission of an electronic communication to one or more recipients, where the electronic communication is any type of message (e.g., an email message, instant message, etc.) that purports to be from a known company with a seemingly legitimate intention, such as a bank, credit card company, telephone carrier, or the like. However, this message is actually intended to deceive the recipient into sharing his or her sensitive information. Often the message draws the recipient to a counterfeit version of the company's web page designed to elicit sensitive information, such as the recipient's username, password, credit card information, or social security number.

For example, a malware author may transmit an email message to a recipient purporting to be from a financial institution and asserting that a password change is required to maintain access to the recipient's account. The email includes a Uniform Resource Locator (URL) that directs the recipient to a counterfeit version of the institution's website requesting the recipient to enter sensitive information into one or more displayable input fields in order to change the recipient's password. Neither the email message nor the URL is associated with the actual financial institution or its genuine website, although the email message and the counterfeit website may have an official appearance and imitate a genuine email and website of that financial institution. The phishing attack is completed when the recipient of the email message enters and submits sensitive information to the website, which is then delivered to the malware author for illicit use.

Identifying phishing websites has been a challenging cybersecurity problem. Some conventional cybersecurity systems have been configured to rely on whitelists and blacklists of known benign (i.e., legitimate) URLs and malicious URLs, respectively, to protect users. Other conventional cybersecurity systems use computer vision-based techniques to identify phishing websites by (i) a virtual determination of display elements of a web page as to whether their respective renderings (i.e., visual appearances) are "too similar" to display elements of a known legitimate web page and (ii) an evaluation that these web pages have inconsistent domains (e.g., domain for a prospective phishing web page is different than a similar, legitimate web page). From a cyber-threat detection perspective, each of these conventional cybersecurity systems has one or more drawbacks, including increased inconclusiveness as whitelist/blacklist analyses do not provide a robust overall analysis and computer vision analyses experience time constraints that limit the number of displayable elements to analyze per web page, which adversely affects the thoroughness of such analyses.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1:
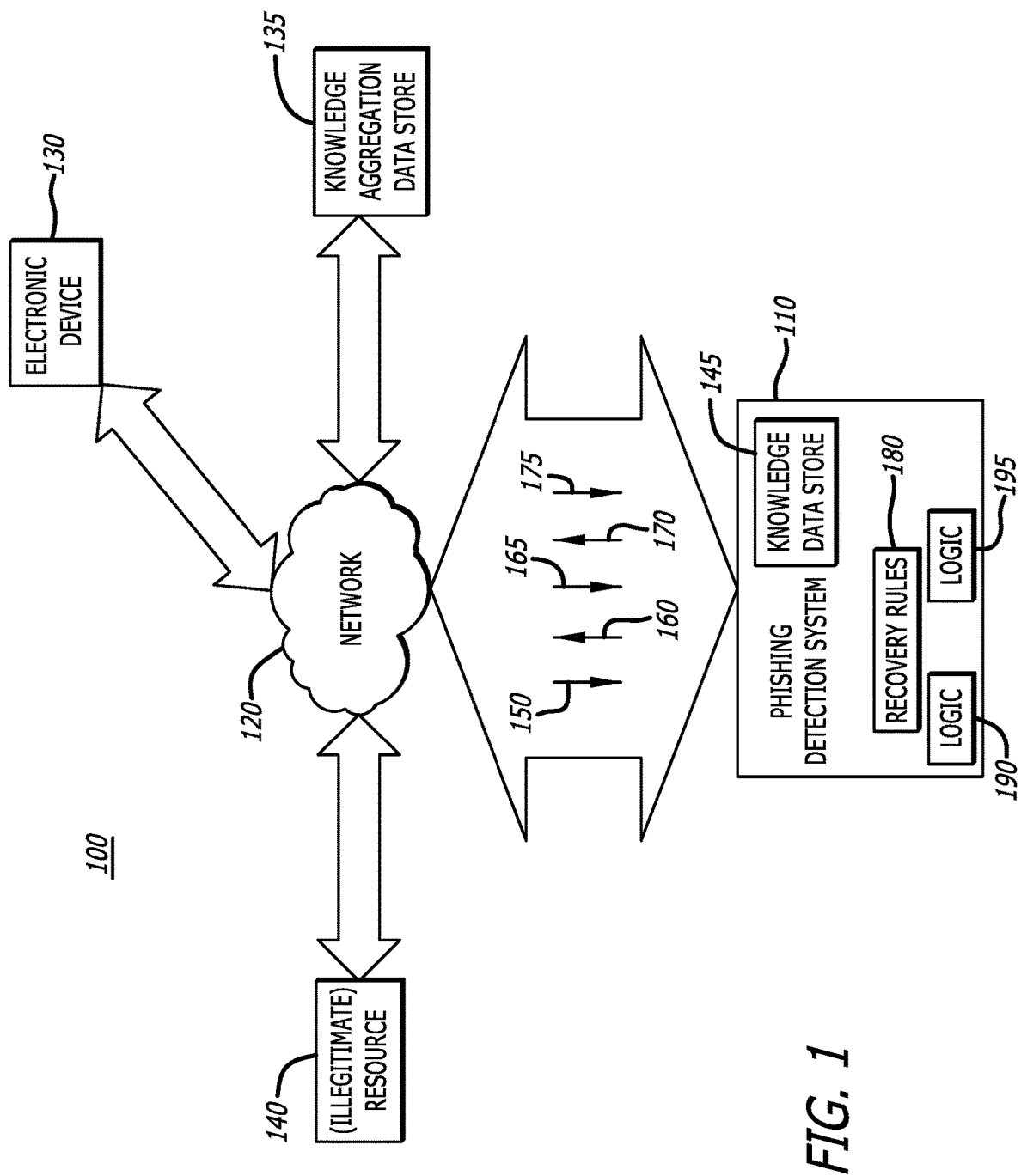
FIG. 1 is an exemplary block diagram of a communication network including a phishing detection system.

Various embodiments of the disclosure are directed to an improved system that analyzes code segments associated with suspect web pages to detect a cyberattack involving impersonation, such as a phishing cyberattack for example. According to one embodiment of the disclosure, the phishing detection system is configured to retrieve display code, namely at least one code segment that pertains to displayable data accessible via a suspect Uniform Resource Locator (URL), which is submitted from separate electronic devices for a customer (or subscriber), for rendering the displayable data when provided to a suitable application (e.g. web browser). From the retrieved code segment and/or one or more code segments subsequently recovered based, either directly or indirectly, on addressing information within links and/or hyperlinks included as part of the retrieved code segment, the phishing detection system determines whether the suspect URL is associated with a phishing cyberattack. For embodiments described in this disclosure, the displayable data accessible via the suspect URL and/or addressing information within the links and/or hyperlinks (referred to as "link URLs") may correspond to web pages. However, in other embodiments, the displayable data may correspond to a stored document when the URL relies on file transfer protocol (FTP).

In order to improve the accuracy of the verdict, namely the classification of the suspect URL as part of a phishing cyberattack or not, the phishing detection system is further configured to (i) parse the display code (e.g., a code segment retrieved using the suspect URL) to identify links and/or hyperlinks (hereinafter, generally referred to as "links") included in the retrieved code segment; (ii) recover one or more additional code segments accessible via the link URLs contained within the links, where the recovery of the additional code segments is conducted in accordance with a code segment recovery scheme as described below; (iii) perform analytics on each code segment to determine whether that code segment is correlated with a code segment forming a malicious web page previously detected to be part of a prior phishing cyberattack; and (iv) generate an alert message including meta-information associated with the analytic results, code segments and/or URLs if any of the code segments is correlated with a prior phishing code segment. For example, this meta-information may include, but is not limited or restricted to the URL, Internet Protocol (IP) address of the electronic device providing the electronic communication including the URL received by the phishing detection system, domain of the phishing web page, target of the phishing cyberattack (e.g., destination address), or the like.

Herein, the term "code segment" generally refers to information returned in a response to a request for displayable data, such as a web page in which the information would be used to render the web page. As one example, the code segment may include, but is not limited or restricted to embedded JavaScript within an HTML page versus an external JavaScript call. As another example, the code segment may include (a) content associated with a web page (e.g., Hypertext Markup Language "HTML" content) and/or (b) information that at least partially controls a visual representation or style (e.g., color, font, spacing) of the HTML content to be rendered (e.g. Cascading Style Sheet "CSS" file), provided the style information is included as part of the code segment. In some configurations, however, the code segment may pertain to web page (HTML) content without the style information. Instead, the style information may be provided as a separate code segment where the request for displayable date results in multiple HTTP GET messages. As a result, the first code segment may be analyzed against HTML code segments based on prior phishing cyberattacks conducted through malicious alteration of the HTML code segment while the second code segment may be analyzed against portions or representations of CSS files, each based on a prior phishing cyberattack conducted through malicious alteration of the CSS file. Herein, as an illustrative example, the code segment may be content associated with the entire web page or a portion of the web page.

More specifically, according to one embodiment of the disclosure, the phishing detection system features information collection logic, parsing logic, heuristic logic, and fuzzy hash generation and detection logic. For this embodiment of the disclosure, the information collection logic is configured to obtain a code segment associated with a web page that is accessible via a suspect URL or a link URL. If the code segment for an error message is returned to the phishing detection system in lieu of the code segment for the web page, one or more analyses (e.g., statistical analysis, characteristic analysis, etc.) may be conducted on the code segment for the error message to determine whether the error message constitutes a customized error message being part of a phishing cyberattack. Otherwise, when the code segment associated with web page is acquired, the parsing logic is configured to parse through that code segment and identify any links within that code segment.

The level of parsing may depend on whether the phishing detection system is operating to support real-time analysis of the URL. If not, parsing may continue until completion of analysis of all recovered code segments accessed using link URLs. If operating in accordance with time constraints, the extent of code segments being recovered for analysis via URLs within the links may be limited by recovery rules that control operability of the parsing logic. For instance, for each URL analysis, the recovery rules may limit the parsing logic as to a number (maximum) of code segments to be recovered from links or may limit the number of nested link stages from which the code segments may be recovered (hereinafter, "code segment depth").

Concurrently with operations of the parsing logic, the heuristic logic may conduct a statistical analysis (e.g., analyze of the number of advertisements, the number of Document Object Model "DOM" objects, the number of links, etc.) and/or an analysis of the characteristics of a code segment under analysis (e.g., presence of a displayable element such as a user interface "UI" element, etc.). The results of these analyses are used to determine whether the suspect URL may be associated with a phishing cyberattack. If the results suggest that the code segment is not associated with a phishing cyberattack, analysis of the code segment ceases. Otherwise, this "non-determinative" or "suspicious" code segment is provided to the fuzzy hash generation and detection logic for further analysis.

The fuzzy hash generation and detection logic performs a logical transformation of the code segment to produce a smaller sized representation (e.g., a hash value), which may be compared to representations (e.g., hash values) of code segments associated with known phishing web pages. The fuzzy hash generation and detection logic is also configured to conduct a "fuzzy hashing" detection, namely a comparison of hash values of two distinctly different items in order to determine a fundamental level of similarity (e.g., expressed as a percentage or value) between these two items. Where the hash value of the code segment is correlated with a code segment associated with a known phishing web page, namely a particular level of correlation (correlation threshold) has been met or exceeded, the code segment is considered to be part of a phishing cyberattack. Hence, the suspect URL is labeled as part of a phishing attack, where one or more alert messages may be generated to notify administrators, targeted electronic devices and source electronic devices that are part of the same enterprise network, and meta-information associated with the detected phishing cyberattack may be uploaded to a knowledge data store.

Herein, the term "correlation" refers to a level of similarity between two items, such as a hash value of a code segment acquired for a phishing analysis and any hash values of known phishing code segments for example, which meets or exceeds a prescribed correlation threshold. The "correlation threshold" is set between a first correlation range that represents a low-to-average likelihood of the URL being part of a phishing cyberattack and a second correlation range that represents an extremely high likelihood of the URL being part of a phishing cyberattack. This correlation threshold may be determined empirically in light of recent known phishing cyberattacks and may be configurable to optimize the accuracy of verdicts by placement of the correlation threshold below the second correlation range to reduce the number of false positives and above the first correlation range in efforts to eliminate false negatives.

Also, the correlation threshold may be programmable (updateable) and may differ depending on the type of displayable data being requested through the URL. For example, a correlation threshold relied upon for detection may be adjusted based, at least in part, on the current threat landscape. Hence, according to this embodiment, a first correlation threshold may be applied for a first data type identified as currently experiencing a greater concentration of phishing attacks than a second data type assigned a second correlation threshold. Here, the first correlation threshold would be lower than the second correlation threshold. As lower thresholds tend to reduce the likelihood of false negatives albeit potentially increase the likelihood of false positives, the adjustment (or intermittent throttling) of correlation thresholds may be conducted to take into account those data types currently being targeted for phishing attacks by reducing thresholds for particular data types with high threat activity to avoid false negatives and upwardly adjust the correlation threshold with threat activity reduction. This threshold throttling may be used to maximize phishing detection system performance and accuracy.

As an illustrative example, the phishing detection system may be configured to receive a URL for analysis and provide the URL to a first component (e.g., information collection logic). According to one embodiment of the disclosure, the information collection logic may be configured to conduct a preliminary filtering operation to identify URLs associated with web pages known to lead to false positives and false negatives (e.g. URLs matching known legitimate domains maintained as part of a URL whitelist and/or URLs matching known malicious domains maintained as part of a URL blacklist, etc.). If the URL is either suspicious (e.g., URL is identified in both the URL blacklist and URL whitelist) or non-determinative (e.g., URL is not identified in at least the URL whitelist or the URL blacklist if utilized), the information collection logic retrieves display code associated with a web page accessible via the suspect URL. The display code corresponds to one or more retrieved code segments (generally referred to as the "retrieved code segment") for use in rendering a web page when provided to a web browser application. A second component, namely the parsing logic, is configured to parse the retrieved code segment to identify a presence of any links. The parsing logic, alone or in combination with the information collection logic, recursively recovers one or more code segments associated with each link within the retrieved code segment as well as any links within recovered code segments until reaching a maximum point of content configurable "code segment depth," as described above.

The retrieved code segment and recovered code segment (s) continue to be provided to a third component, namely heuristic logic, for filtering as described below. Depending on the filtering results from the heuristic logic, a fourth component, namely the fuzzy hash generation and detection logic, analyzes some or all of the code segments to determine whether these code segments indicate that the suspect URL is associated with a phishing cyberattack.

According to one embodiment of the disclosure, the heuristics logic may include one or more interactive filters, layout filters, and/or error page filters. An interactive filter is configured to determine whether the code segment under analysis includes a displayable element operating as a user interface (UI) element or requesting activity by the user (e.g., call a particular telephone number or access a certain web page). The UI element may include one or more user input fields (e.g., text boxes, drop-down menus, buttons, radio dials, check boxes, etc.), which are configured to receive input from a user (e.g., account number, credit card information, user name, password, etc.).

The layout filters are configured to identify characteristics associated with known phishing web pages, where the characteristics may be programmable depending on the phishing threat landscape. For instance, one layout filter may determine the number of advertisements present on the web page, as the current threat landscape suggests that phishing web pages tend to fall below a first (minimum advertisement) threshold. Similarly, another layout filter may determine the number of HTML DOM objects or the number of links in HTML DOM objects, where the current threat landscape suggests that phishing web pages tend to feature DOMs that exceed a second (maximum DOM) threshold and/or links that exceed a third threshold.

The error page filter may be configured to ignore error pages returned in response to a network request for a webpage corresponding to a URL based on certain types of errors. For instance, these types of errors are often specified as HTML error codes, and may include general web server errors (e.g. HTML error code 500) or errors occurring when the requested webpage cannot be found (e.g., HTML error code 404) such as in the case of a mistyped URL, etc. The error page filter may be further used to compute term frequency-inverse document frequency for custom error pages, and if the computed frequency is greater than certain threshold then code segment will be sent for further analysis, otherwise filtered out. Additionally error filter could be used to compute similarity threshold with custom error pages knowledge base used for phishing. Similarity will work same way as described in similarity analysis of web page but will have a separate configurable threshold value.

Furthermore, in some embodiments, the heuristics logic may also filter out code segments conforming to code commonly featured in known legitimate (e.g., non-phishing) web pages, referred to as a "web page whitelist," and/or code commonly featured in illegitimate (e.g., phishing) web pages referred to as a "web page blacklist." For web page whitelist detection, the code segment may be discarded from further analysis. For web page blacklist detection, the heuristics logic may also filter the code segment from further analysis, but the reporting logic of the phishing detection system may generate and issue an alert message directed to an administrator associated with a system having provided the received URL or a system targeted to receive the URL (if the URL is intercepted in transit from the malicious source) for example. If the heuristics logic fails to filter the code segment from further analysis, as described above, the code segment is provided to the fourth component such as the fuzzy hash generation and detection logic.

According to one embodiment of the disclosure, the fuzzy hash generation and detection logic generates a hash value based on information associated with the code segment under analysis and compares (relying on a correlation threshold) the generated hash value with hash values associated with each of a known corpus of code segments associated phishing web pages. If the generated hash value is determined to be "correlated" with a hash value associated with a code segment associated with a known phishing web page, namely the generated hash value meets or exceeds a correlation threshold positioned by empirical data between the first correlation range and the second correlation range as described above, the received URL may be determined to be associated with phishing cyberattacks. The generated hash value represents a transformation of the code segment, which may include, for example, the HTML content, CSS file, JavaScript images, or the like. If a phishing determination is made by the fuzzy hash generation and detection logic, an alert message may be issued in accordance with a selected notification scheme such as to a security administrator for the network including the destination electronic device. If a determination of phishing cannot be made, the phishing detection system may be configured to issue a message to the source of the received URL and/or a security administrator that the analysis of the received web page content was inconclusive.

In some embodiments, where an inconclusive determination is made, the phishing detection system will not issue any message. Depending on the results of this inconclusive determination and reaching the threshold of "suspiciousness," which may be a collective determination made by multiple (weighted) plug-ins deploying the phishing detection logic without any of these plug-ins having a conclusive determination, the phishing detection system may provide the suspect URL and any meta-information associated therewith (e.g., retrieved code segment, recovered code segments, link URLs associated with the recovered code segments, etc.) to a secondary phishing detection system. Hence, the phishing detection system may also be practiced in combination with prior phishing detection systems leveraging computer vision techniques to identify web pages that are visually similarly with known legitimate web pages but do not share a similar domain, thereby indicating a phishing cyberattack as described in U.S. patent application Ser. No. 15/721,948 filed Oct. 1, 2017 entitled "Phishing Attack Detection," the contents of which are incorporated by reference herein. Herein, the below described phishing detection system combined with the computer vision techniques may collectively limit false positives while detecting phishing URLs.

I. Terminology

In the following description, certain terminology is used to describe various features of the invention. For example, the terms "logic," "component" and "module" are representative of hardware, firmware or software that is configured to perform one or more functions. As hardware, logic (or component or module) may include circuitry having data processing or storage functionality. Examples of such circuitry may include, but are not limited or restricted to a hardware processor (e.g., microprocessor with one or more processor cores, a digital signal processor, a graphics processing unit (GPU), a programmable gate array, a microcontroller, an application specific integrated circuit "ASIC", etc.), a semiconductor memory, or combinatorial elements.

Logic (or component or module) may be software that includes code being one or more instructions, commands or other data structures that, when processed (e.g., executed) to perform a particular operation or a series of operations. Examples of software include an application, a process, an instance, Application Programming Interface (API), subroutine, plug-in, function, applet, servlet, routine, source code, object code, shared library/dynamic link library (dll), or a collection of HTML elements. This software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or engine/component) may be stored in persistent storage.

As described above, the term "code segment" refers to information returned in a response to a request for a web page to be rendered on a display device. The code segment may include, but is not limited or restricted to (a) content associated with a web page (e.g., Hypertext Markup Language "HTML") and/or (b) information associated with style (e.g., color, font, spacing) of the content to be rendered (e.g. Cascading Style Sheet "CSS" file. The "content" generally relates to a collection of information, whether in transit (e.g., over a network) or at rest (e.g., stored), often having a logical structure or organization that enables it to be classified for purposes of analysis for phishing detection. The content may include code data (e.g., code that assists in a web browser application to render the web page), executables (e.g., a script, JavaScript block, Flash file, etc.), and/or one or more non-executables. Examples of a non-executable may include an image. Other examples of non-executables, especially where the content is being routed to a document editor application in lieu of a web browser application, may include a document (e.g., a Portable Document Format "PDF" document, Microsoft® Office® document, Microsoft® Excel® spreadsheet, etc.), a file retrieved from a storage location over an interconnect, or the like.

The term "electronic device" should be generally construed as electronics with data processing capability and/or a capability of connecting to any type of network, such as a public network (e.g., Internet), a private network (e.g., a wireless data telecommunication network, a local area network "LAN", etc.), or a combination of networks. Examples of an electronic device may include, but are not limited or restricted to, the following: a server, a mainframe, a firewall, a router; an info-entertainment device, industrial controllers, vehicles, or an endpoint device (e.g., a laptop, a smartphone, a tablet, a desktop computer, a netbook, gaming console, a medical device, or any general-purpose or special-purpose, user-controlled electronic device).

The term "message" generally refers to signaling (wired or wireless) as either information placed in a prescribed format and transmitted in accordance with a suitable delivery protocol or information made accessible through a logical data structure such as an API. Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMESSAGE; Instant Message Access Protocol (IMAP); or the like. Hence, each message may be in the form of one or more packets, frame, or any other series of bits having the prescribed, structured format.

The term "computerized" generally represents that any corresponding operations are conducted by hardware in combination with software and/or firmware. In certain instances, the terms "compare," "comparing," "comparison," or other tenses thereof generally mean determining if a match (e.g., identical or a prescribed level of correlation) is achieved.

The term "interconnect" may be construed as a physical or logical communication path between two or more electronic devices or between different logic (engine/components). For instance, a physical communication path may include wired or wireless transmission mediums. Examples of wired transmission mediums and wireless transmission mediums may include electrical wiring, optical fiber, cable, bus trace, a radio unit that supports radio frequency (RF) signaling, or any other wired/wireless signal transfer mechanism. A logical communication path may include any mechanism that allows for the exchange of content between different logic.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General Architecture

Referring now to FIG. 1, an exemplary block diagram of an embodiment of a communication network 100 featuring a phishing detection system 110 is shown. The phishing detection system 110 is communicatively coupled to a network 120 and receives one or more Uniform Resource Locators (URLs) 150 for analysis. Each URL 150 may be provided from an electronic device 130 requesting analysis of the suspect URL 150 as to its association with a phishing cyberattack or may be extracted from content within an electronic communication from a resource 140, which may be part of the network 120 (e.g., edge electronic device, firewall, etc.) or remotely located from the network 120 (e.g., web server, endpoint device, etc.). As an illustrative embodiment, the resource 140 may be a web server that operates as an illegitimate resource providing at least one phishing web page as part of a phishing cyberattack directed toward the electronic device 130.

As shown in FIG. 1, the phishing detection system 110 is configured to analyze display code 165 including at least one code segment which, when processed, is used to render a web page for display. The display code 165 may be retrieved in response to one or more request messages 160 (e.g., HTTP GET message(s), HTTP POST message(s), etc.), which is sent by the phishing detection system 110 and includes the suspect URL 150. Besides the display code 165, one or more additional code segments 175 may be recovered by the phishing detection system 110 through subsequent request messages 170 that would include addressing information from the links (e.g. link URLs). The links may be included as part of the display code 165 or included as part of recovered code segments 175.

More specifically, upon receipt of the suspect URL 150 for analysis, as an optional feature, the phishing detection system 110 may be configured to conduct a preliminary analysis of the suspect URL 150. The preliminary URL analysis may include accessing a URL blacklist and/or URL whitelist (not shown) to determine if the suspect URL 150 is associated with a known phishing website or is associated with a known trusted website. If the suspect URL 150 is found in both the URL blacklist and whitelist (i.e., suspect URL 150 is deemed "suspicious") or is not found in either the URL blacklist or the URL whitelist (i.e., suspect URL 150 is deemed "non-determinative"), the phishing detection system 110 issues the request message 160 including the suspect URL 150 to retrieve the display code 165.

Figure 2:
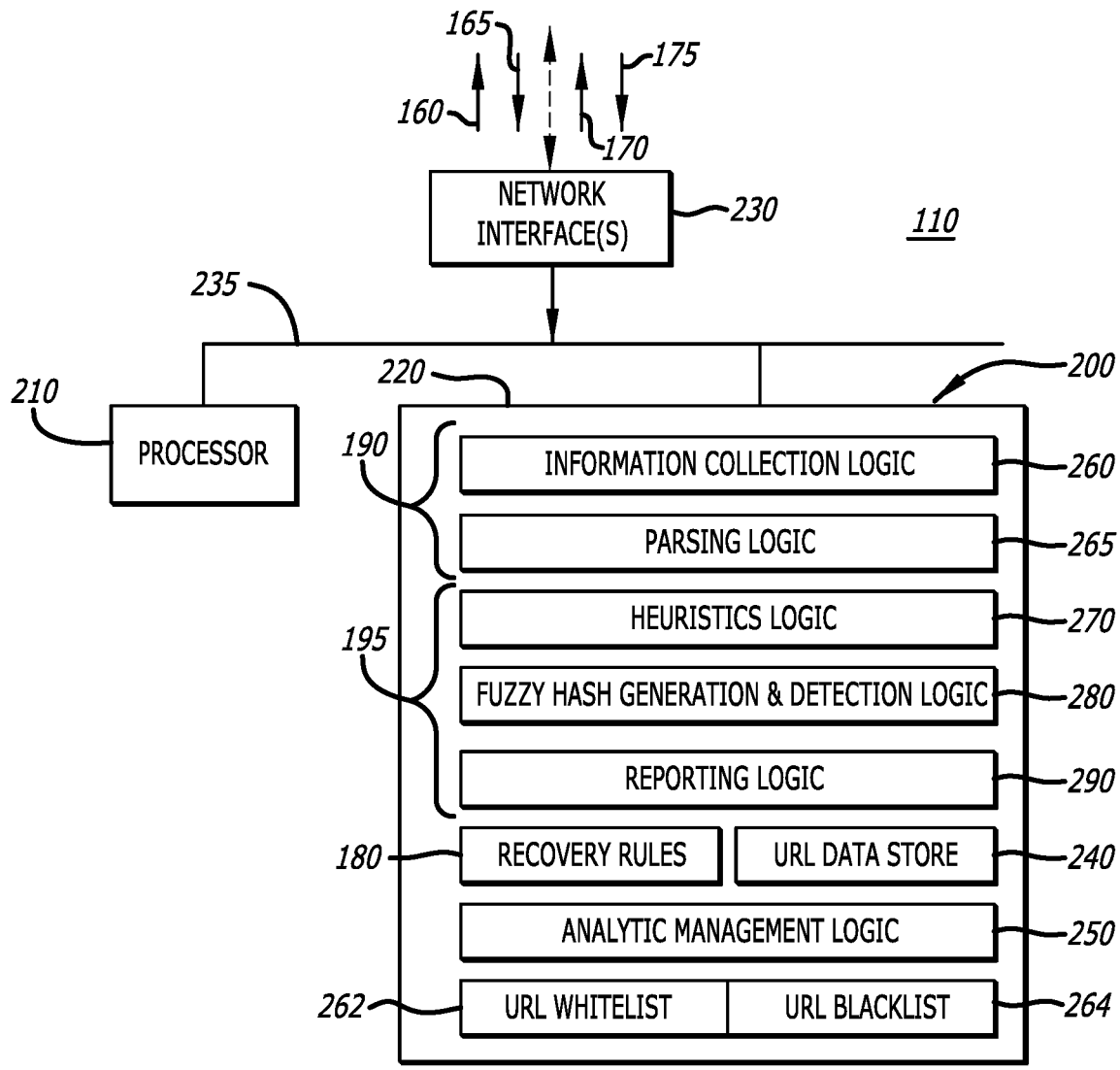
FIG. 2 is an embodiment of an exemplary architecture of the phishing detection system of FIG. 1.

Upon receipt of the display code 165 (referred to as "retrieved code segment 165"), the phishing detection system 110 may parse the retrieved code segment 165 in order to recover any additional code segments associated with links included within the retrieved code segment 165. Using some or all of the links, depending on the code segment recovery scheme deployed, the phishing detection system 110 may generate additional request messages 170 to recover additional code segments 175. The code segment recovery scheme, which sets the ordering and selection of the link URLs included in the request message(s) 170, may be controlled through processing and enforced compliance to recovery rules 180 by logic 190 within the phishing detection system 110. The logic 190 features information collection logic 260 and parsing logic 265 as shown in FIG. 2 and described below.

For instance, the recovery rules 180 may be configured to impose limits on a maximum number (R, R>1) of code segments to be obtained from links. For instance, the phishing detection system 110 may include a counter that is incremented (or decremented) to monitor the number of code segments (up to R) being recovered for analysis of a specific URL for phishing. The counter may be reset (e.g., set to "0" for incremental counter or "R" for decremental counter) for each URL analysis. When the logic 190 determines that the maximum number of code segments have been obtained, the logic 190 is precluded from recovering any more code segments and classification of the URL is based on the analytic results produced from the "R" recovered code segments.

Figure 4A:
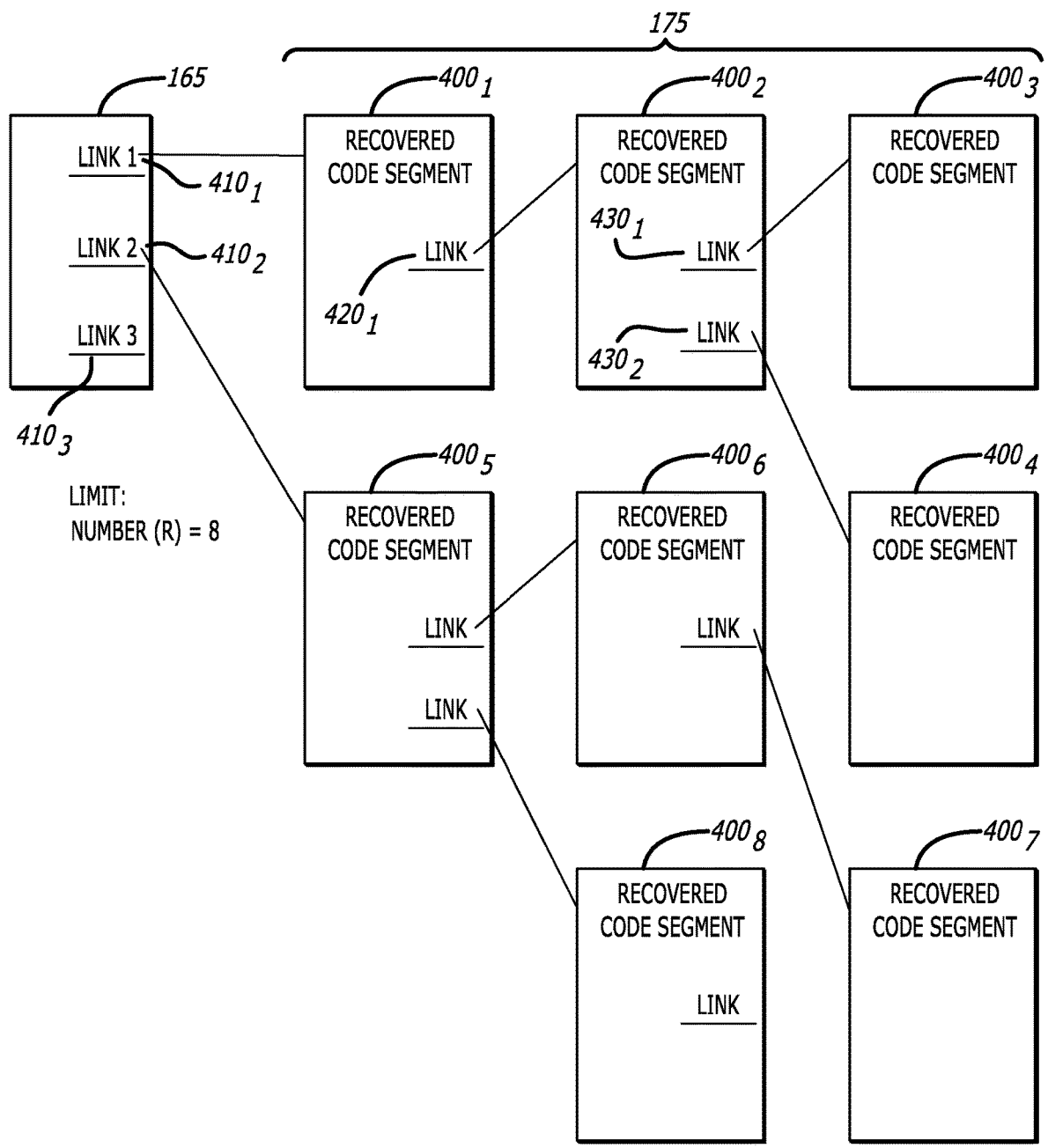
FIGS. 4A-4B are exemplary representations of the operations conducted by the parsing logic of the phishing detection system to recover code segments for analysis.
Figure 4B:
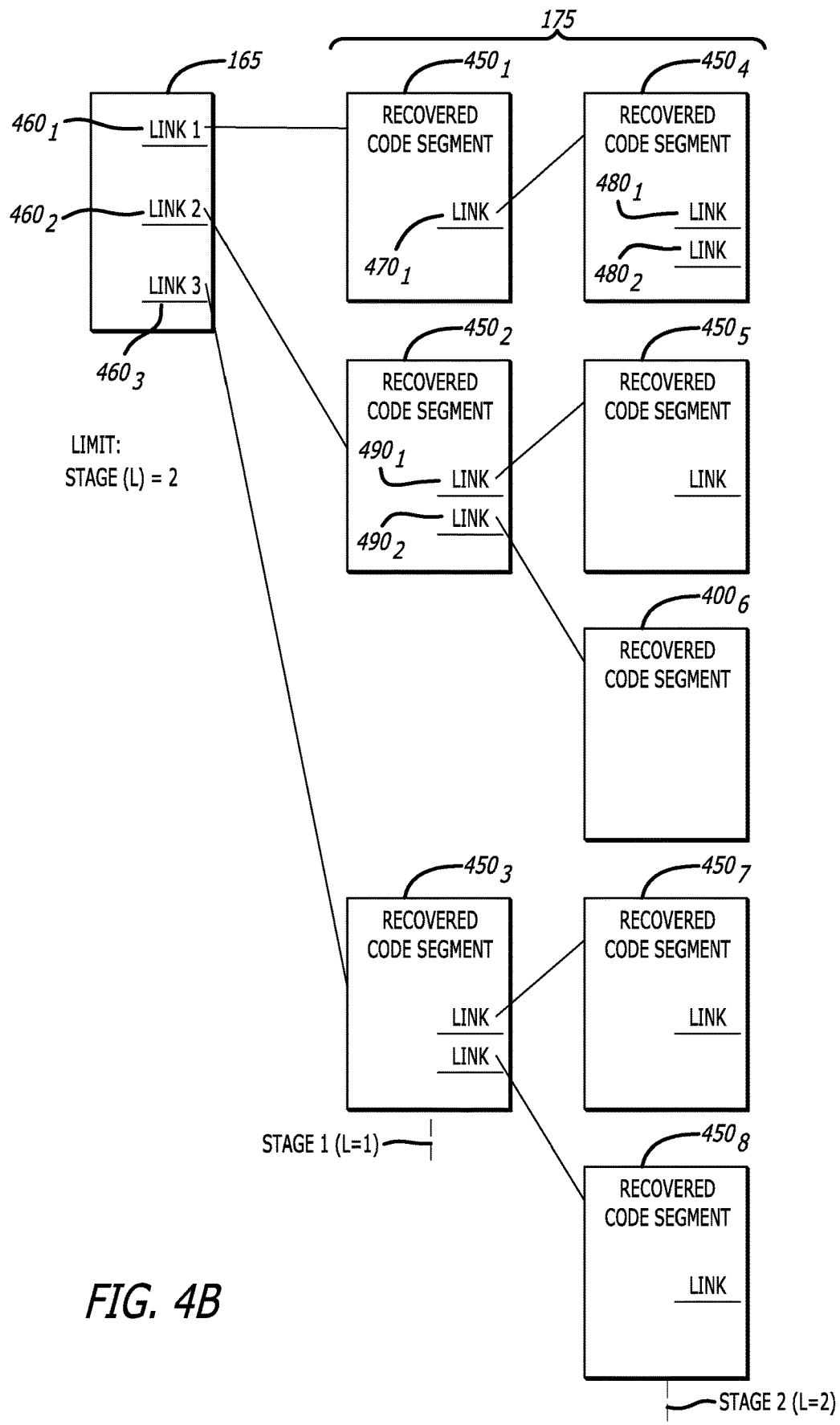

Additionally, or in the alternative, the recovery rules 180 may control the selection and limit the depth (stages) in recovering additional code segments 175 using link URLs within nested links, such as linked URLs from a recovered code segment as shown in FIGS. 4A-4B. For instance, the logic 190 within the phishing detection system 110 may select a first link in the retrieved code segment 165 and continue recovering code segments associated with all of the nested links therefrom. Upon completing recovery of code segments associated with the nested links originating from the first link in the retrieved code segment 165, the phishing detection system 110 continues code segment recovery by selecting a second link of the retrieved code segment 165 and recovering the code segment associated with the second link and any additional code segments associated with nested links originating from the second link, as permitted by constraints set forth in the recovery rules 180.

For each of the received code segments 165/175 (i.e., either retrieved code segment 165 based on the suspect URL 150 or any recovered code segment 175 based on a subsequent link URL), the logic 190 within the phishing detection system 110 determines whether the code segment 165/175 corresponds to known benign code segments. If so, the phishing detection system 110 may determine that the suspect URL 150 is non-phishing and halt further analysis of the code segments 165/175. In contrast, upon determining that one or more code segments 165/175 correspond to at least one code segment from a known phishing web page, the phishing detection system 110 may generate and issue an alert message (not shown) directed to one or more of the following: (1) the electronic device 130 that supplied the suspect URL 150 to the phishing detection system 110, or (2) an electronic device (not shown) maintained by an administrator responsible for monitoring the electronic device 130, or (3) the resource 140 in the event that the resource 140 is hosted and maintained on a local network to which the electronic device 130 is connected. In contrast, where the suspect URL 150 is extracted from an intercepted electronic communication in transit to the electronic device 130, the phishing detection system 110 may generate and issue an alert message to the electronic device 130 or the electronic device (not shown) maintained by the administrator, in order to potentially restrict or block further communications with the resource 140 (e.g., illegitimate web server).

Where the code segment 165/175 does not correspond to known benign code segments or known phishing code segments, additional logic 195 within the phishing detection system 110 may conduct a statistical analysis (e.g., analyze of the number of advertisements, the number of Document Object Model "DOM" objects, the number of links and/or hyperlinks, etc.) and/or an analysis of the characteristics of that code segment 165/175 (e.g., presence of a displayable element such as an interactive UI element, etc.). These analytic results may be used to determine whether more detailed analyses of the code segment 165/175 are needed to render a verdict (determination) as to whether the URL is part of a phishing cyberattack. If the analytic results suggest that the received URL is not part of a phishing cyberattack, further analyses of the code segment are not needed. Otherwise, if the verdict is "non-determinative" or "suspicious," the code segment 165/175 (e.g., the retrieved code segment 165 or any recovered code segment(s) 175) undergoes a hash operation to generate a hash value representative of the code segment 165/175.

Thereafter, this hash value undergoes a "fuzzy hash" comparison (as described above) with hash values associated with a known corpus of phishing web pages maintained within a knowledge data store 145 to determine whether the code segment 165/175 is part of a phishing cyberattack. The fuzzy hash comparison is further conducted by the logic 195 within the phishing detection system 110 to determine a correlation between the hash value of the (suspicious or non-determinative) code segment 165/175 and any hash value associated with the known corpus of phishing web pages, where the correlation represents equaling or exceeding a likelihood of the code segment 165/175 being associated with a phishing cyberattack. This likelihood corresponds to a correlation threshold that is selected to reside between a first correlation range (e.g., likelihood of phishing) and a second correlation range that represents a higher chance of the suspect URL 150 being part of a phishing cyberattack (e.g., likelihood of phishing). The correlation threshold is specifically selected to reside between particular correlation range to substantially eliminate false negatives and substantially reduce the number of false positives by selection of the threshold low enough to avoid negatively impeding the processing speed of the phishing detection system 110 while sufficiently eliminating a presence of false negatives.

Herein, the knowledge data store 145 includes hash values associated with the known corpus of phishing web pages, which may be occasionally updated based on (i) internal operations of the phishing detection system 110 and/or (ii) downloads from a global, knowledge aggregation data store 135. The knowledge aggregation data store 135 maintains and continues to augment its known, global corpus of phishing web pages received from the phishing detection system 110 as well as other phishing detection systems. Hence, the phishing detection system 110 may upload hash values of detected phishing content (web pages) and download a more robust corpus of phishing web pages from the knowledge aggregation data store 135 into the knowledge data store 145.

According to one embodiment of the disclosure, this correlation threshold may be programmable (updated) and may differ depending on the type of displayable data associated with the code segment 165/175 to be via the suspect (or link) URL. For instance, the correlation threshold relied upon for detection of a URL associated with a phishing web page may be lower than a correlation threshold relied upon for detection of a URL for retrieval of a document being used as part of a phishing attack, especially when the current threat landscape identifies a greater concentration of phishing attacks being directed against web page content than documents with integrated or embedded links. As lower thresholds tend to reduce the likelihood of false negatives albeit potentially increasing the likelihood of false positives, the adjustment of thresholds may be conducted to take into account those data types currently being targeted for phishing attacks by reducing thresholds for particular data types with high threat activity in order to avoid false negatives and upwardly adjusting the threshold as threat activity for that particular data type lessened. This correlation threshold throttling may be used to maximize performance of and accuracy of the results by the phishing detection system 110.

If the hash value of the code segment 165/175 is determined to be "correlated" with any hash value of known phishing code segments, the suspect URL 150 is determined to be associated with a phishing cyberattack. Responsive to detecting the code segment 165/175 (and the subject URL 150) is part of a phishing cyberattack, an alert message is issued to a predetermined destination (e.g., source of the received URL, a security administrator, etc.) that may be in a position to halt the phishing cyberattack and/or perform actions to remediate the cyberattack. If a phishing determination cannot be made, namely the correlation between the hash value of the code segment 165/175 and a hash of known phishing web pages is less than the correlation threshold (e.g., falls within the first correlation range), depending on the level of correlation, the phishing detection system 110 may provide the suspect URL 150 and/or meta-information associated with the suspect URL 150 to a secondary phishing detection system (e.g., computer vision-based system; network or third-party analyst system, etc.) or to the knowledge data store 145 for subsequent use. In some embodiments, where a non-determinative classification is made, the phishing detection system 110 will not issue an alert message, as described above.

Referring now to FIG. 2, an illustrative embodiment of internal architecture of the phishing detection system 110 and the interoperability of stored logic 200, inclusive of logic 190 and 195 of FIG. 1, is shown. The phishing detection system 110 comprises a processor 210, a memory 220 including the stored logic 200, and one or more network interfaces (referred to as "network interface(s)") 230, which are coupled together by a system interconnect 235, such as a bus. In general, as described below, one or more portions of the stored logic 200, when executed by the processor 210, perform operations that include (i) collection and analysis of the retrieved code segment 165 that is accessible via the request message 160 including the suspect URL 150 and/or one or more recovered code segments 175 each accessible via a request message 170 including corresponding link URLs, and (ii) a determination as to whether any of the code segments are correlated with a code segment for a known phishing web page, which denotes that the suspect URL 150 is part of a phishing cyberattack.

Herein, according to one embodiment of the disclosure, the processor 210 is one or more multipurpose, programmable components that accept digital information as input, process the input information according to stored instructions, and provide results as output. One example of a processor may include an Intel® x86 central processing unit (CPU) with an instruction set architecture although other types of processors as described above may be utilized.

The memory 220 operates as system memory, which may include non-persistent storage and/or persistent storage. The memory 220 includes a URL data store 240, an analytic management logic 250, information collection logic 260, parsing logic 265, heuristics logic 270, fuzzy hash generation and detection logic 280, and reporting logic 290. Herein, as an illustrative example, the phishing detection system 110 may be configured to receive a suspect URL for analysis and the suspect URL is temporarily stored the URL data store 240. For this embodiment, the analytic management logic 250 monitors the URL data store 240 for any recently received URLs, and upon detection, provides the suspect URL to the information collection logic 260.

The information collection logic 260 is configured to conduct a preliminary filtering operation on the URL (e.g., suspect URL 150 of FIG. 1) by at least comparing the suspect URL 150 to URLs associated with known legitimate domains and/or URLs associated with known phishing domains. This preliminary filtering is conducted to eliminate, from further analyses, URLs directed to known trustworthy or known phishing web pages in order to reduce false positives and false negatives. This may involve the information collection logic 260 accessing a URL whitelist 262 and/or URL blacklist 264 that may be stored locally (as shown) or may be stored remotely. If the suspect URL extracted from the URL data store 240 is suspicious or non-determinative (e.g., the suspect URL 150 is found in both the URL whitelist 262 and the URL blacklist 264 or the suspect URL 150 is not located in either the URL whitelist 262 or URL blacklist 264), the information collection logic 260 retrieves the display code (referred to as the "retrieved code segment" 165) for a web page associated with the suspect URL 150.

The parsing logic 265 parses the retrieved code segment 165 to identify additional links included in the retrieved code segment 165. These links may include link URLs directed to the same domain (or subdomain) as the resource 140 providing the retrieved code segment 165 or may be directed to a different domain (and/or subdomain). For this embodiment, operating with the information collection logic 260, the parsing logic 265 performs an iterative process in the recovery of code one or more code segments associated with each identified link. These recovered code segment(s) may be provided to the heuristic logic 270 for further analysis.

According to one embodiment of the disclosure, the heuristics logic 270 may include filtering logic that is configured to determine whether a code segment under analysis (e.g., retrieved code segment 165 or any recovered code segment 175, generally referenced as "code segment 165/175"), includes certain displayable elements (e.g., element with user input fields) and/or certain layout characteristics associated with known phishing web pages or custom error pages that may be used in a phishing cyberattack in efforts to entice the user to perform an action (e.g., call a particular phone number, send an email message, etc.) to gain more information pertaining to the user.

Where the filtering logic of the heuristics logic 270 cannot definitively conclude that the code segment 165/175 part of a phishing attack or benign, namely the code segment 165/175 is determined by the filtering logic to be suspicious or non-determinative, the heuristics logic 270 provides the code segment 165/175 to the fuzzy hash generation and detection logic 280. The fuzzy hash generation and detection logic 280 conducts a further analysis of the code segment 165/175, which is conducted to improve reliability of the URL classification.

According to one embodiment of the disclosure, the fuzzy hash generation and detection logic 280 generates a hash value associated with one or more portions (or entirety) of the code segment 165/175. Thereafter, the fuzzy hash generation and detection logic 280 determines whether the generated hash value is correlated with one or more hash values associated with a known corpus of code segments from phishing web pages. According to one embodiment of the disclosure, if a generated hash value associated with the code segment 165/175 (e.g., retrieved code segment 165 or any recovered code segment 175) is determined to be correlated with a hash value of a code segment associated with a known phishing web page, the code segment 165/175 is determined to be associated with a phishing cyberattack. As a result, the suspect URL 150 is determined to be associated with a phishing cyberattack. Alternatively, additional logic may be deployed to collect correlation results (scores) for the retrieved code segment 165 and one or more recovered code segments 175, and perform an arithmetic operation on the results (e.g., average value, maximum value, median value, etc.) in determining whether the suspect URL 150 is associated with a phishing cyberattack.

If a phishing cyberattack determination is made by the fuzzy hash generation and detection logic 280, the reporting logic 290 may issue an alert message via network interface 230 to either a source of the suspect URL 150 or destination of an electronic communication including the suspect URL 150, and/or a security administrator. If such a determination cannot be made by the fuzzy hash generation and detection logic 280, the reporting logic 290 may provide the suspect URL 150, code segment 165/175 and/or any meta-information associated with the code segment 165/175 to a secondary phishing detection system as described above, although in some embodiments, the reporting logic 290 may refrain from involving other phishing detection systems, especially when there is a significant lack of correlation between the generated hash value ad hash values associated with known phishing web pages.

Referring still to FIG. 2, the network interface(s) 230 may include one or more network ports containing the mechanical, electrical and/or signaling circuitry needed to connect the phishing detection system 110 to the network 120 to thereby facilitate communications to other remotely located electronic devices. To that end, the network interface(s) 230 may be configured to transmit and/or receive messages using a variety of communication protocols including, inter alia, Transmission Control Protocol/Internet Protocol (TCP/IP), Hypertext Transfer Protocol (HTTP), or HTTP Secure (HTTPS).

Figure 3:
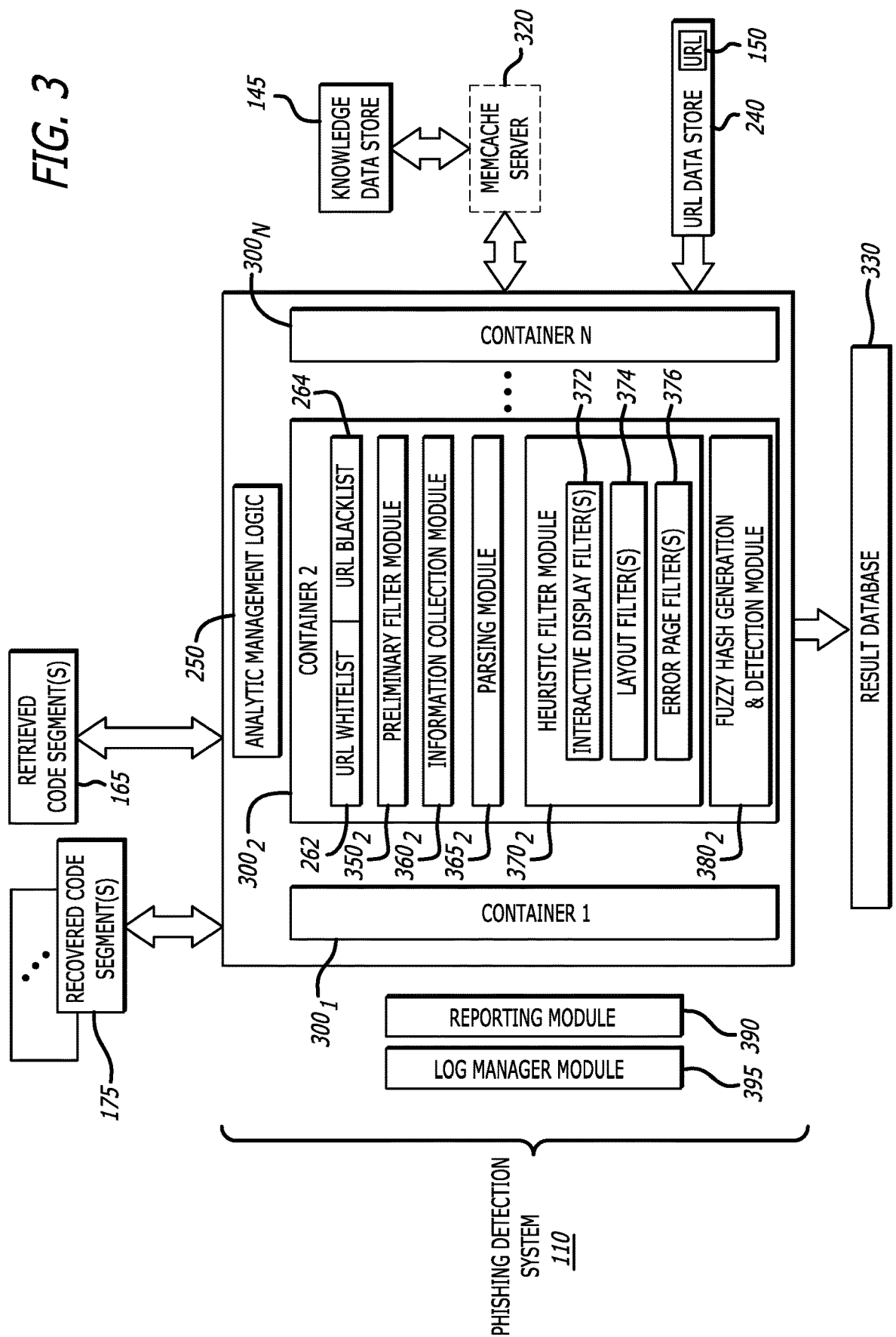
FIG. 3 is a logical representation of the phishing detection system of FIG. 1 operating with a remote knowledge data store for malicious fuzzy hash comparison for a phishing cyberattack.

Referring to FIG. 3, an illustrative embodiment of an embodiment of the logical architecture of the phishing detection system 110 and the interoperability is shown. Herein, the phishing detection system 110 may be configured to receive the suspect URL 150 for analysis. According to one embodiment of the disclosure, the suspect URL 150 may be uploaded from an electronic device, which received an incoming message including the suspect URL 150 and extracted the suspect URL 150 for transmission to and analysis by the phishing detection system 110. For this URL delivery scheme, alert messages may be provided to the electronic device or an administrator responsible for operability of the electronic device (or a network including the electronic device). Alternatively, the suspect URL 150 may be intercepted from electronic communications between a resource and a destination device (e.g., the web server 140 and the electronic device 130 of FIG. 1). For this URL delivery scheme, alert messages may be provided to the destination or an administrator supporting the destination device.

As shown, the suspect URL 150 may be stored in the URL data store 240, which may operate as a URL input queue. Herein, the analytic management logic 250 monitors contents of the URL data store 240, and upon receipt of the suspect URL 150, the analytic management logic 250 determines one of a plurality of containers to handle analysis of the suspect URL 150. For instance, responsive to detection of the suspect URL 150, the analytic management logic 250 may assign processing of the suspect URL 150 to one of a plurality of containers $300_1$-$300_N$ (N>1). Each "container" features logic, such as a collection of software modules (e.g., software instances) that, upon execution, conducts processing of the suspect URL 150 to determine whether the URL is associated with a phishing cyberattack. As illustrated, each container $300_1$-$300_N$, such as a second container $300_2$ for example, includes a preliminary filter module $350_2$, information collection module $360_2$ and a parsing module $365_2$, as well as a heuristics filter module $370_2$, and a fuzzy hash generation and detection module $380_2$. These modules include software utilized by the second container $300_2$, and correspond in functionality to the information collection logic 260, the parsing logic 265, the heuristics logic 270 and the fuzzy hash generation and detection logic 280 of FIG. 2, respectively. The plurality of containers $300_1$-$300_N$ allow for parallel processing of different URLs (suspect URL or any link URLs) by the phishing detection system 110.

As shown, the analytic management logic 250 selects a second container $300_2$ during which the preliminary filter module $350_2$, upon execution by processor 210 of FIG. 2, may retrieve the suspect URL 150 from the URL data store 240 and conduct a preliminary filtering operation, using the URL whitelist 262, to identify whether the suspect URL 150 is associated with any known trusted domain of a legitimate source (e.g., URL 150 matches a known, trusted domain). Additionally, or in the alternative, the preliminary filter module $350_2$ may conduct a preliminary filtering operation, using the URL blacklist 264, to identify whether the suspect URL 150 is associated with any known malicious domain of an illegitimate source (e.g., URL 150 matches a known, malicious domain maintained within the URL blacklist 264). The preliminary filtering operation is conducted to identify URLs associated with a known trusted (or untrusted) domain in attempts to avoid unnecessary analyses that may lead to false positives or false negatives.

Where the suspect URL 150 fails to match any URL associated with a known trusted domain (or perhaps a known phishing domain), the suspect URL 150 is considered to be "non-determinative." Similarly, where the suspect URL 150 matches any URL associated with a known trusted domain and a known phishing domain, the suspect URL 150 is considered to be "suspicious." If the suspect URL 150 is either "non-determinative" or "suspicious," the information collection module $360_2$, upon execution by processor 210 of FIG. 2, retrieves a code segment 165 of FIGS. 1-2 being information accessible via the suspect URL 150, such as information associated for rendering a web page.

The parsing module $365_2$ parses the code segment 165 to determine if any additional links (e.g., embedded links, hyperlinks, etc.) are located within the code segment 165. For any additional links uncovered by the parsing module $365_2$, the information collection module $360_2$ may further recover additional code segments 175 based on the link URLs included in each of these additional links, where the additional code segments correspond to "nested" web pages accessible through the web page accessible using the suspect URL 150. The heuristic and fuzzy hash generation and detection operations (described below) may be performed in parallel with the parsing of code segments associated with the suspect URL 150 (e.g., retrieved or a recovered code segment is being analyzed while one or more other code segments are being recovered) or may be performed serially (e.g., code segments are analyzed serially).

Each code segment 165 or 175 is requested by the information collection module $360_2$ and provided to the heuristics filter module $370_2$. Herein, multiple code segment(s) 165 and 175 associated with web pages accessible via the suspect URL 150 and link URLs included within the retrieved code segment and any recovered code segment, may be analyzed to assist in determining whether the suspect URL 150 could be associated with a phishing cyberattack.

The heuristics filter module $370_2$, according to one embodiment of the disclosure, may include one or more interactive display filters 372, layout filters 374, and error page filters 376. The interactive display filter 372 is configured to determine whether the code segment 165/175 includes a displayable element operating as a user interface (UI) element or requesting activity by the user (e.g., call a particular telephone number or access a certain web page). The UI element includes one or more user input fields (e.g., text boxes, drop-down menus, buttons, radio dials, check boxes, etc.) that are configured to receive input from a user (e.g., account number, credit card information, user name, password, etc.). If not, the code segment 165/175 is longer treated as a candidate for phishing attack within context of this phishing detection system 110.

However, if the code segment 165/175 includes the displayable element, the layout filter 374 commences an analysis of the code segment 165/175 to identify characteristics associated with known phishing web pages. Depending on the current threat landscape, the characteristics may be changed by installing different layout filters 374 into the phishing detection system 110. As described above, a first type of layout filter 374 may determine the number of advertisements present on the web page to be rendered by the code segment 165/175, where the code segment 165/175 may constitute a phishing web page where the number of advertisements within the portion of code segment 165/175 falls below a first (minimum ad) threshold. Likewise, a second type of layout filter 374 may determine the number of HTML DOM objects, where the code segment 165/175 may constitute a phishing web page upon including a number of HTML DOM objects exceed a second (maximum DOM) threshold. Additionally, or in the alternative, the layout filter 374 may determine a number of links within the HTML DOM objects, where the code segment 165/175 may constitute a phishing web page upon including a number of HTML DOM links exceeds a third threshold.

Being part of the heuristics filter module $370_2$, the error page filter 376 is configured to determine whether an error page is a customized (phishing) error page. This determination is based, at least in part, on the frequency-inverse document frequency, namely the frequency in repetition of occurrences of error pages that suggest legitimate behavior if the computed frequency is greater than a certain threshold. Additionally, the error page filter 376 could be used to compute similarity threshold with custom error pages knowledge base used for phishing. Similarity will work same way as described in similarity analysis of web page but will have a separate configurable threshold value. Additionally, or in the alternative, the error page filter 376 may ignore error pages with certain commonly occurring HTTP error codes from analysis (e.g., error page based on "HTTP error code 500," error pages based on "HTTP error code 404," etc.).

If the heuristics filter module $370_2$ filters the code segment 165/175 from further analysis, the phishing detection system 110 may continue its analysis associated with other (recovered) code segments 175. Optionally, depending on the findings that occur in connection with the filtering operations, the heuristics filter module $370_2$ may extract context information associated with the code segment 165/175 and the suspect URL 150 and provide the context information to a remote secondary system for analyst review. For instance, the context information may be used to provide intelligence that may be used to alter the heuristic filter module $370_2$, blacklist/whitelist (not shown), and the knowledge data store 145. If the code segment 165/175 (and corresponding URL (s)) is not filtered from further analysis by the heuristics filter module $370_2$, the code segment 165/175 are provided to the fuzzy hash generation and detection module $380_2$.

According to one embodiment of the disclosure, the fuzzy hash generation and detection module $380_2$ performs a one-way hash operation on at least a portion of the code segment 165/175 or its entirety, which generates a hash value. Thereafter, the fuzzy hash generation and detection module $380_2$ conducts a correlation evaluation between the hash value of the code segment 165/175 and hash values associated with code segments of a known corpus of phishing web pages included in the memcache server 320, and where not loaded therein, within the knowledge data store 145 (or subsequently fetched from the knowledge aggregation data store 135 of FIG. 1. If the generated hash value is determined to be "correlated" with a hash value of a code segment of a known phishing web page, namely a level of correlation meets or exceeds a correlation threshold, the suspect URL 150 associated with the code segment 165/175 is determined to be associated with a phishing cyberattack. The generated hash value represents a data transformation of the code segment 165/175 forming web page content, which may include HTML source code, CSS, and/or page-embedded JavaScript elements.

Referring still to FIG. 3, if a phishing determination is made by the fuzzy hash generation and detection module $380_2$, results of the analysis (e.g., hash value, meta-information associated with the web page content, etc.) is provided to a result database 330 for storage. In addition, as described above, an alert message may be issued by a reporting module 390. Additionally, a log manager module 395 may store meta-information associated with the analysis, such as which URLs and/or code segment (represented by hash values) has been determined to be associated with a phishing cyberattack. Such meta-information may be transmitted by the reporting module 390 to the knowledge data store 145 and/or memcache server 320.

III. Illustrative Parsing of the Retrieved Code Segment

As an illustrative example, referring now to FIGS. 4A-4B, exemplary representations of the operations conducted by the parsing logic 265 of the phishing detection system 110 to recover the additional code segments 175 for analysis are shown. The additional code segments 175 (referred to herein as "recovered code segments") are represented individually as $400_1$-$400_R$ (R≥1). While the heuristic logic 270 and the fuzzy hash generation and detection logic 280 control the analysis of each recovered code segment 175 in a determination as to whether the submitted URL 150 is associated with a phishing cyberattack, the parsing logic 265 controls the collection of the recovered code segments 175.

As shown in both FIG. 2 and FIG. 4A, the parsing logic 265 operates in accordance with the recovery rules 180, which may be configured to impose limits on a maximum number (R) of code segments $400_1$-$400_R$ that can be recovered from links (links and/or hyperlinks). For instance, the phishing detection system 110 may be configured with a counter (not shown), which may be used in the monitoring the acquisition of a maximum recovery of "R" code segments for analysis. As illustrated, the retrieved code segment 165 may include a plurality of links $410_1$-$410_3$. The parsing logic 265 of the phishing detection system 110 (see FIG. 2) parses the retrieved code segment 165 to detect links $410_1$-$410_3$.

Depending on the recovery rules 180, the parsing logic 265 may be adapted to select a first link $410_1$ in the retrieved code segment 165 and, in operation with the information collection logic 260, recovers a first (recovered) code segment $400_1$ in response to issuance of a request (HTTP GET) message including the link URL associated with the first link $410_1$. The operation of the parsing logic 265 may be conducted in parallel with the heuristic analysis and "fuzzy hash" comparisons between a representation of the code segment $400_1$ and a representation of known phishing code segments to determine whether any of the code segments $400_1$-$400_R$ is correlated with a known phishing code segment.

More specifically, in an iterative operation, the parsing logic 265 may be adapted to select a first link $420_1$ in the first code segment $400_1$ and, in operation with the information collection logic 260, recovers a second code segment $400_2$ after issuance of a request (HTTP GET) message including information associated with the first link $420_1$. Thereafter, the parsing logic 265 may be adapted to select a first link $430_1$ in the second code segment $400_2$ and the information collection logic 260 recovers a third code segment $400_3$. Upon determining that the third code segment $400_3$ does not include any links, in accordance with its static or programmable code segment recovery scheme, the parsing logic 265 reverts back to its nearest code segment (e.g., the second code segment $400_2$) and select a second link $430_2$ in the second code segment $400_2$ to recover a fourth code segment $400_4$. This reiterative, code segment recovery scheme continues until no further recovered code segments are available or a maximum number (R) of code segments $400_1$-$400_R$ have been acquired for analysis by the phishing detection system 110.

Referring now to FIGS. 2 & 4B, the parsing logic 265 operates in accordance with the recovery rules 180, which may be configured to impose limits on a maximum code segment depth (L) for recovered code segments 450 subject to acquisition for analysis by the phishing detection system 110. For instance, as illustrated, the phishing detection system 110 may be configured to analyze code segments up to a maximum code segment depth (stages) of "2" recovered code segments.

As shown in FIG. 4B, the retrieved code segment 165 may include a plurality of links $460_1$-$460_3$. The parsing logic 265 of the phishing detection system 110 (see FIG. 2) parses the retrieved code segment 165 to detect links $460_1$-$460_3$. Depending on the recovery rules 180, the parsing logic 265 may be adapted to select a first link $460_1$ in the retrieved code segment 165 and, in operation with the information collection logic 260, recovers a first (recovered) code segment $450_1$ in response to issuance of a request (HTTP GET) message including the link URL associated with the first link $460_1$. The operation of the parsing logic 265 may be conducted in parallel with the heuristic analysis and "fuzzy hash" comparisons with various code segments 165 and $450_1$-$450_8$ to determine whether any of these various code segments 165 and $450_1$-$450_8$ is correlated with a known phishing code segment.

In an iterative operation, the parsing logic 265 may be adapted to further select a second link $460_2$ in the retrieved code segment 165 and, in operation with the information collection logic 260, recovers a second code segment $450_2$ after issuance of a request (HTTP GET) message including the link URL associated with the second link $460_2$. Thereafter, the parsing logic 265 continues in a reiterative manner by selecting a third link $460_3$ in the retrieved code segment 165 and, in operation with the information collection logic 260, recovers a third code segment $450_3$.

Upon determining that the retrieved code segment 165 does not include any further links, in accordance with the code segment recovery scheme deployed, the parsing logic 265 may advance to the first code segment $450_1$ and selects a first link $470_1$ in the first code segment $450_1$ to recover a fourth code segment $440_4$. This reiterative, code segment recovery scheme continues until a maximum code segment depth (L) have been met, in which case, no further recovery of lower-depth code segments is conducted. As shown, the parsing logic 265 refrains for selection of links $480_1$-$480_2$ for recovery of the code segments thereof, as such code segments would exceed the maximum code segment depth. Instead, the parsing logic 265 reverts back to the first recovered code segment $450_1$, and given no further links, the parsing logic 265 again reverts to the second recovered code segment $450_2$.

As the second recovered code segment $450_2$ includes a plurality of links $490_1$-$490_2$, the parsing logic 265 selects the first link $490_1$ in the second code segment $450_1$ to recover a fifth code segment $450_5$. This code segment recovery process continues operating in a similar matter to recover code segments $450_6$-$450_8$.

IV. Illustrative Operational Flow of the Phishing Detection System

Figure 5:
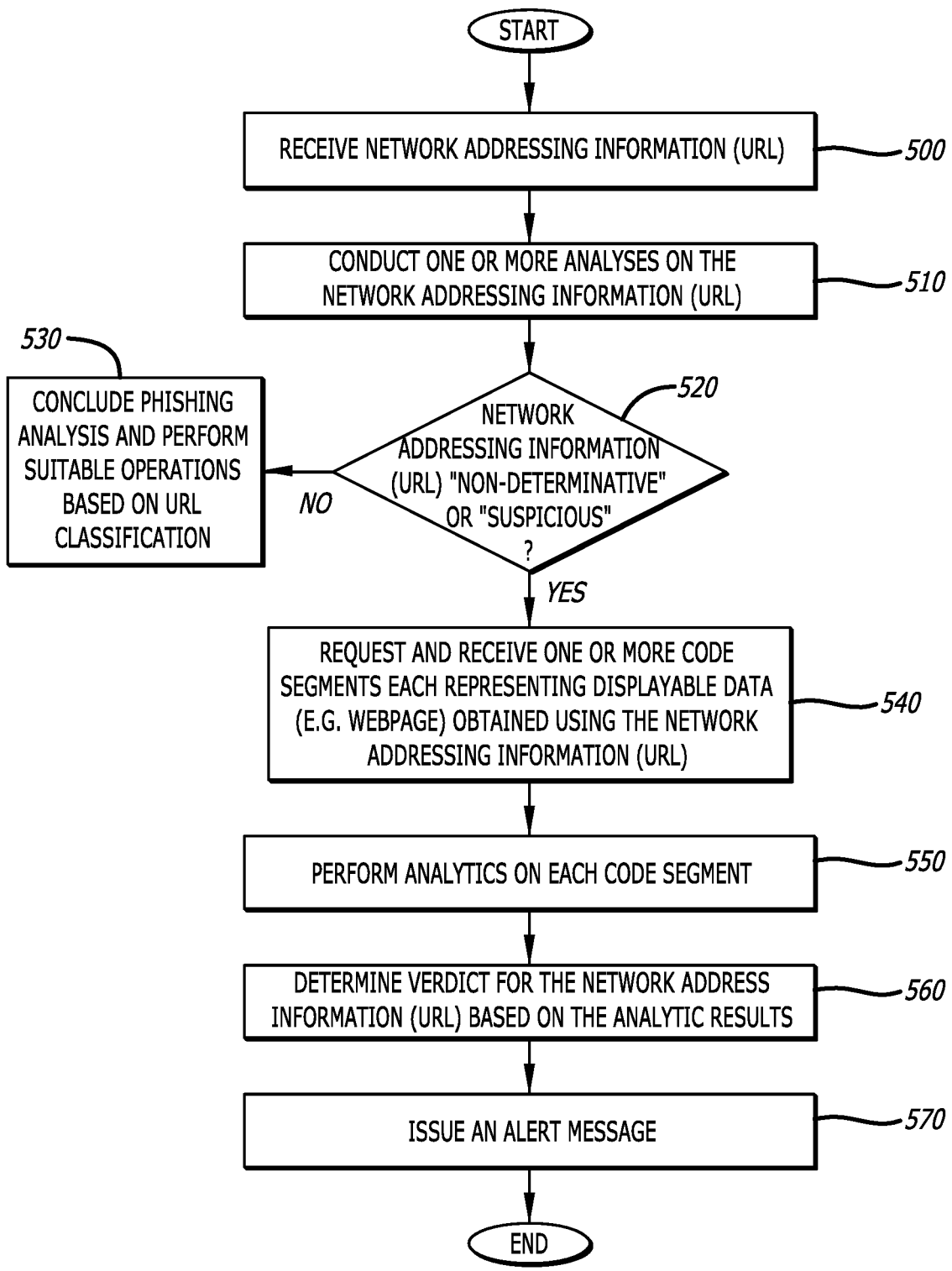
FIG. 5 is an exemplary flowchart of the operations of the phishing detection system of FIGS. 1-3.

Referring now to FIG. 5, an exemplary flowchart of the operations of the phishing detection system 110 of FIGS. 1-3 is shown. Herein, network addressing information, namely a suspect URL or a linked URL for example, is provided for analysis by the phishing detection system (operation 500). After receipt of the network addressing information, the phishing detection system conducts one or more analyses on the network addressing information to formulate an initial determination for such information (operations 510 and 520). For example, where the network addressing information corresponds to a known phishing address, the phishing detection system classifies the network addressing information as being part of a phishing cyberattack and generates an alert message with respect to detection of this cyberattack. No further analysis of the network addressing information is needed. Similarly, where the network addressing information corresponds to a trustworthy address, the phishing detection system 110 classifies the network addressing information as being benign and discontinues further phishing analysis directed to the network addressing information (operation 530).

Where the network addressing information is "non-determinative" or "suspicious" as described above, the phishing detection system performs further operations in determining whether the network addressing information is part of a phishing cyberattack. In particular, the phishing detection system generates at least one request message, including at least a portion of the network addressing information, which prompts receipt of one or more response messages (operation 540). Herein, a request message may prompt a response message that includes a code segment featuring HTML content and CSS (style) information associated with a web page accessible via the network addressing information. Alternatively, a request may cause generation of a first request message that prompts the return of a first response message that features a first code segment including HTML content and a second request message that prompts the return of a second response message that features a second code segment including CSS (style) information.

Each response message may include a code segment, and the phishing detection system performs analytics on each of the code segments (operation 550). Based on the results of these analytics, the phishing detection system may determine a verdict (phishing, benign, inconclusive) for the submitted network addressing information. Where the verdict concludes that the network address information is part of a phishing attack, the phishing detection system generates an alert message including at least the network address information and meta-information including at least a portion of the analytic results (operations 560 and 570). Also, based on the results of these analytics, the phishing detection system may make the analytic results available to a knowledge data store or network administrator (e.g., generate an alert message for a "phishing" verdict) or may provide the code segment and/or context information associated with the code segment (e.g., source or destination of the network addressing information, some or all of the analytic results, etc.) to a secondary phishing detection system (e.g., computer vision-based system) or other type of threat analysis system for analysis.

An illustrative example of the analytics conducted on the code segments received by the phishing detection system is described below, although other analytics or a variation of the analytics may be performed on the code segments in efforts to identify whether any of the code segments compares to code segments associated with a known phishing cyberattack.

(1) The phishing detection system may extract network addressing information (e.g., URL) from each link within a code segment to recover another code segment to commence analysis of additional network addressing information at operation 500. The extraction of network addressing information may be conducted in accordance with a code segment recovery scheme set forth in the recovery rules 180 being processed by the parsing logic 265 (e.g., maximum code segment analyzed, maximum depth of analysis based on the depth of the nested URLs, etc.);

(2) Each code segment is associated with a corresponding response messages to maintain context information pertaining to the code segment;

(3) Perform analytics on each code segment based on heuristic filters, which may include content-based analytics directed particular content within the code segment and statistical analytics directed to a number of advertisements, links or layout parameters for the code segment. Except for an error message, the code segments may be directed to a particular web page or may be directed to particular aspects of the web page (e.g., HTML content, CSS (style) content, etc.).

(4) Where the code segment is directed to an error message, the code segment is analyzed in accordance with certain analytics that are specific to error messages.

(5) Generate a "verdict" for each code segment, namely a representation of a likelihood of the code segment being part of a phishing cyberattack.

Figure 6A:
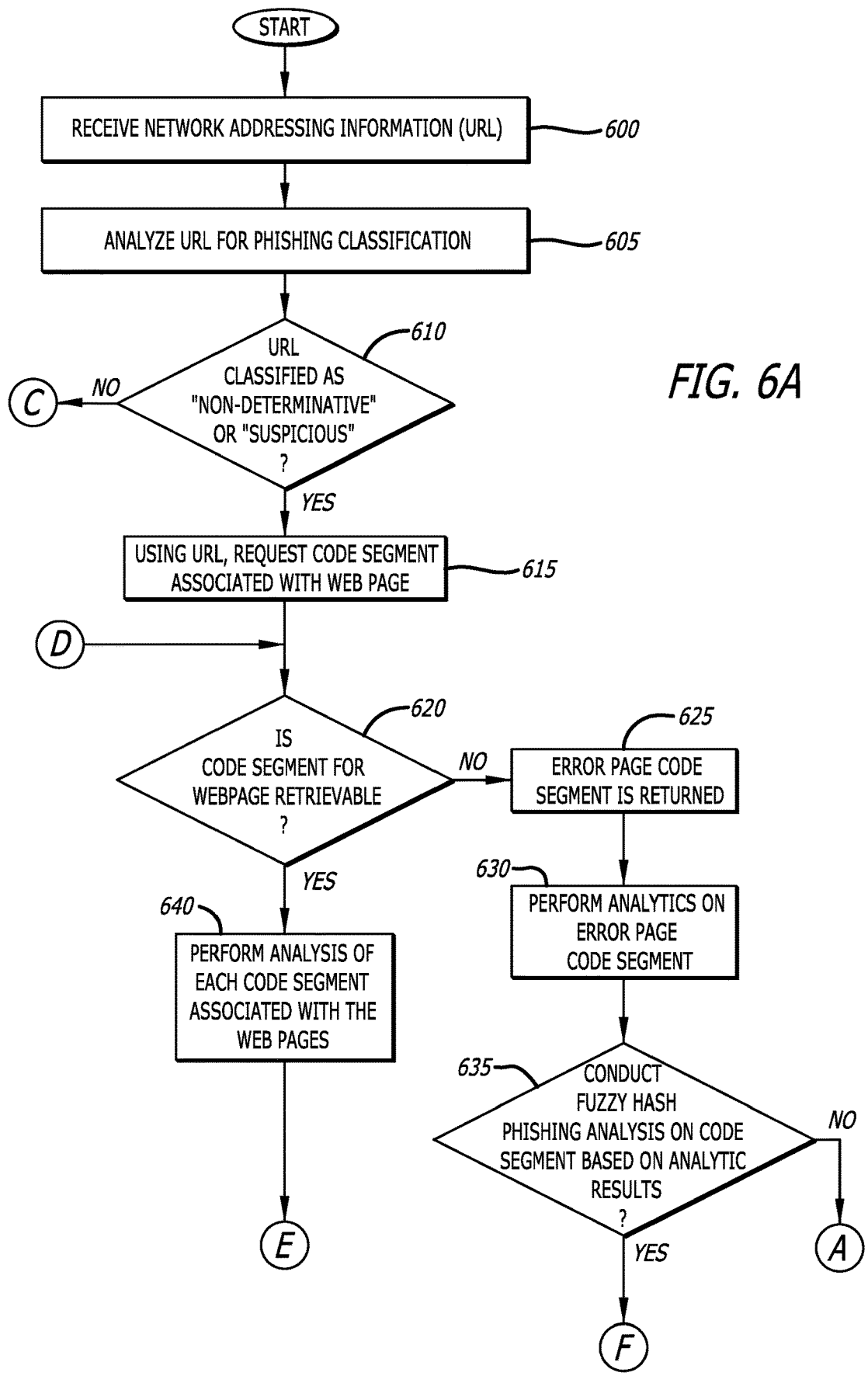
FIGS. 6A-6B are collectively a detailed illustrative flowchart of the operations of the phishing detection system of FIGS. 1-3.
Figure 6B:
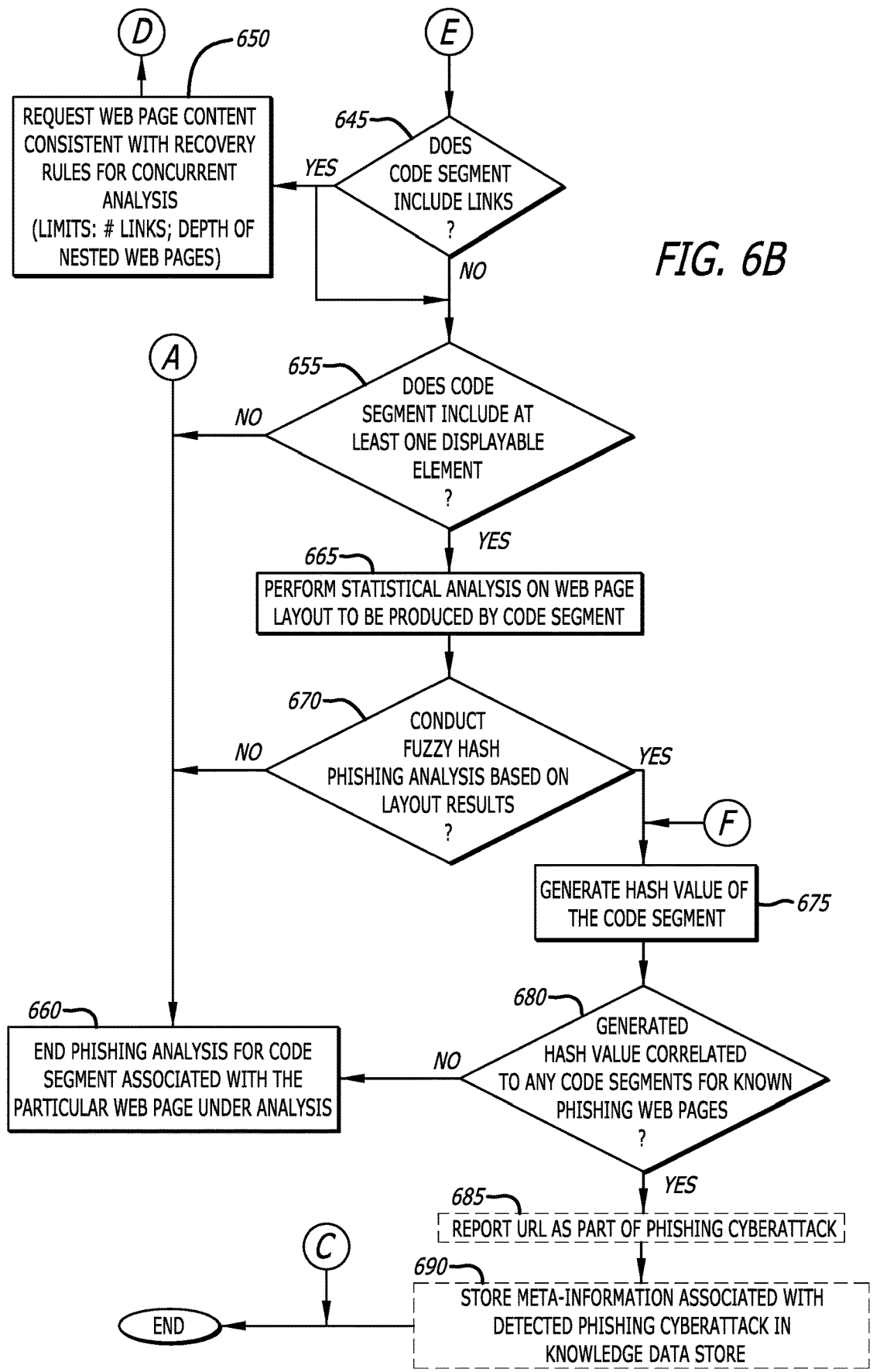

Referring now to FIGS. 6A-6B, an exemplary detailed illustrative flowchart of the operations of the phishing detection system of FIGS. 1-3 is described. Herein, network addressing information, namely information associated with a URL or any type of link (generally referred to as a "URL"), is received for analysis by the phishing detection system (operation 600). After receipt of the URL, the phishing detection system conducts one or more analyses on the URL to determine the URL classification (operation 605). The analyses may include a URL whitelist analysis to determine whether the received URL is located within a URL whitelist, which includes URLs associated with known legitimate web pages. If the URL is detected in the URL whitelist, the URL is considered to be not part of a phishing cyberattack, and further phishing analysis on the URL are ended. Also, the analyses may include a URL blacklist analysis to determine whether the received URL is located within a URL blacklist that includes URLS associated with known illegitimate web pages. If the URL is detected in the URL blacklist, the URL is considered to be part of a phishing cyberattack. In some configuration, the phishing detection system may generate an alert message including the URL and meta-information associated with the URL to report the detected phishing cyberattack. Where the URL is suspicious or non-determinative, the phishing analysis continues (operation 610).

In response to the URL being determined to be suspicious or non-determinative, the phishing detection system generates one or more request messages to retrieve a code segment associated with a web page (operation 615). Based on the response(s) from the one or more request messages, a determination is made whether a code segment associated with the web page is retrievable (operation 620). Where the web page is not retrievable, an error page is returned as the retrieved code segment (operation 625). As a result, the phishing detection system performs analytics on the error page code segment to determine whether the error page is suspicious and further analytics (e.g., fuzzy hash analysis) are needed to determine whether the URL is associated with a phishing cyberattack (operation 630).

For instance, upon receiving the error page, the phishing detection system may perform a content-based analysis of the error page. Additionally, or in lieu of a content-based analysis of the error page, the analytics may be directed to the frequency and/or timing of the error page and the type of error page, such as an error page other than specific common HTML error code(s). As an example, repeated receipt of error pages above a set threshold within a prescribed period of time, where both parameters may be static or programmable, the phishing detection system may determine that the error page may be associated with a phishing cyberattack. Similarly, the presence of error pages directed to specific HTML error codes "404" or "500" may be ignored while error pages directed to other HTML error codes may be further analyzed by the fuzzy hash generation and detection logic (module) as described below. Based on these analytic results, the phishing detection system may determine whether to provide the error page code segment to the fuzzy hash generation and detection logic for a more detailed analysis as to whether the error code page is part of a phishing cyberattack (operation 635).

However, where the web page is retrievable, the phishing detection system performs analytics on the retrieved code segment and any additional code segments recovered using links within the retrieved code segment (operation 640). The analytics may commence with a determination whether the web page includes one or more links (operation 645), as now illustrated in FIG. 6B. If so, compliant with recovery rules and a selected code segment recovery scheme, the phishing detection system may issue additional request messages for the additional code segments directed to web pages and/or documents identified by link URLs included as part of the links (operation 650). The degree of recovery of the additional may be limited through a variety of parameters such as a maximum number of recovered code segments, a maximum depth in recovery of nested embedded links, or the like.

Additionally, the analytics may include a determination as to whether the code segment includes a displayable element (operation 655). If not, phishing detection analysis for that particular code segment ends, where it is inconclusive whether the suspect URL is part of a phishing cyberattack (operation 660). However, if the code segment is determined to include one or more displayable elements, the phishing detection system further conducts analytics directed to statistical analysis of characteristics associated with the web page layout, as represented by the code segment (operation 665). These layout characteristics may be based on the presence of advertisements and/or HTML DOM objects, and in particular, whether the number of advertisements and/or HTML DOM objects exceed a respective threshold, as described above. Based on any or all of the above-described analytics, the phishing detection system determines whether the URL is considered to be suspicious (operation 670) and fuzzy hash correlation operations are performed on the code segment as illustrated in FIG. 6B.

More specifically, the code segment undergoes a hash operation, which generates a hash value representing the code segment (operation 675). The generated hash value is compared with hash values associated with known, phishing code segments to determine whether the generated hash value meets or exceeds a level of correlation established by a correlation threshold with any of the hash values associated with known, phishing code segments (operation 680). If so, a phishing cyberattack is detected for the URL and the phishing attack may be reported and/or meta-information associated with the URL detected as being part of a phishing cyberattack may be uploaded to a knowledge data store (operations 685 and 690). If not, the phishing analysis associated with that particular code segment completes and reiterative operations set forth in operations 620-690 continue for other code segments based on the URL until no further recovered code segments are available to analysis or no further recovered code segments are available based on limitations imposed by the recovery rules. At that time, depending on the comparison results, the phishing detection system may classify the URL as "inconclusive," and provide the URL and/or meta-information associated with the URL to a secondary phishing detection system. Otherwise, the phishing detection system may classify the suspect URL as "benign".

In the foregoing description, the invention is described with reference to specific exemplary embodiments thereof. It will, however, be evident that various modifications and changes may be made thereto without departing from the broader spirit and scope of the invention as set forth in the appended claims. For example, the phishing detection system may be deployed as a cloud service, an on-premises system, functionality implemented within a firewall or within an endpoint device, or the like. Also, while the disclosure is directed to retrieval and recovery of code segments associated with web pages in which the URLs include HTTP protocol information, it is contemplated that the URL phishing detection may be accomplished for retrieval/recovery of code segments associated with content types other than web pages, such as files where the URL is directed to a different protocol type (e.g., file transfer protocol "FTP").

What is claimed is:

1. A computerized method for detecting a phishing cyberattack, comprising:
    parsing at least first code segment retrieved using a suspect uniform resource locator (URL) to identify any links included in the first code segment, wherein the parsing includes recovering one or more additional code segments accessible via addressing information within one or more links included in the first code segment in accordance with a code segment recovery scheme;
    performing analytics on at least the first code segment and each of the one or more additional code segments corresponding to the one or more links when identified as included in the first code segment, wherein the analytics include determining whether any of the first code segment or additional code segment when identified as included in the first code segment is correlated with a code segment associated with a known prior phishing cyberattack, wherein the performing of the analytics on each of at least the first code segment and each of the one or more additional code segments includes conducting one or more filtering operations based on at least one interactive display filter, at least one layout filter, or any combination of the at least one interactive display filters and the at least one layout filter and the at least one layout filter is configured to determine whether a number of advertisements included in the code segment would be present on a rendered web page is less than a first threshold to denote that the code segment is suspicious; and
    generating an alert message including meta-information associated with results from the analytics if any of the first code segment or additional code segment is correlated with the code segment associated with a known prior phishing cyberattack.

2. The computerized method of claim 1, wherein prior to parsing the first code segment, the method further comprising:
    receiving the suspect URL;
    determining that the suspect URL is not associated with any known phishing website or any known trusted website; and
    retrieving the first code segment using the suspect URL in response to determining that the suspect URL is not associated with any known phishing website or any known trusted website.

3. The computerized method of claim 1, wherein the parsing includes recovering the one or more additional code segments in accordance with a code segment recovery scheme that sets an ordering and selection of one or more link URLs corresponding to the addressing information within the one or more links included in the first code segment.

4. The computerized method of claim 3, wherein the code segment recovery scheme is configured to impose limits on a maximum number of code segments recovered using the one or more link URLs.

5. The computerized method of claim 3, wherein the code segment recovery scheme is configured to control a selection and limit on a depth of analysis in recovering the one or more additional code segments using the one or more link URLs.

6. The computerized method of claim 3, wherein at least the first code segment includes at least Hypertext Markup Language (HTML) content for use by a web browser application to generate a web page.

7. The computerized method of claim 3, wherein at least the first code segment further includes information that controls a visual representation of the HTML content to be rendered in forming the web page.

8. The computerized method of claim 1, wherein the at last one interactive display filter is configured to determine whether a code segment from a plurality of code segments including the first code segment and the one or more additional code segments includes a displayable element to receive input from a user.

9. The computerized method of claim 1, wherein the at least one layout filter is further configured to determine whether a number of HTML Document Object Model (DOM) objects included in the code segment would be present on a rendered web page and exceed a first threshold to denote that the code segment is suspicious.

10. The computerized method of claim 1, wherein the performing of the analytics on each of at least the first code segment and each of the one or more additional code segments further includes generating a fuzzy hash value of the first code segment and determining a phishing cyberattack is conducted in response to a correlation between the fuzzy hash value and one or more hash values representing code segments associated with known phishing cyberattacks.

11. The computerized method of claim 10, wherein the fuzzy hash value of the first code segment is correlated to any of the one or more hash values representing code segments associated with a known corpus of phishing web pages upon equaling or exceeding a correlation threshold.

12. A system for detecting phishing cyberattacks, comprising:
    one or more hardware processors; and
    a memory coupled to the one or more hardware processors, the memory comprises
        a first component to parse a first code segment to identify any links within the first code segment,
        a second component communicatively coupled to the first component, the second component configured to acquire one or more code segments, including at the first code segment and one or more additional code segments that are recovered using addressing information from one or more links within the first code segment parsed by the first component,
        at least a third component to perform analytics on each code segment of the one or more code segments to determine whether the code segment is associated with known phishing cyberattack, wherein the third component comprises heuristic logic that performs analytics on each of the one or more code segments, and
        fuzzy hash generation and detection logic configured to generate a hash value of the code segment and determine a phishing cyberattack is being conducted in response to a correlation between the hash value and one or more hash values representing code segments associated with known phishing cyberattacks.

13. The system of claim 12, wherein at least the first code content includes at least Hypertext Markup Language (HTML) content for use by a web browser application to generate a web page.

14. The system of claim 13, wherein at least the first code content further includes information that controls a visual representation of the HTML content to be rendered in forming the web page.

15. The system of claim 13, wherein the second component corresponds to information collection logic that retrieves the first code segment using a uniform resource locator (URL) submitted for analysis and the one or more additional code segments using the addressing information from the one or more links.

16. The system of claim 15 further comprising:
a fourth component to issue an alert message to identify the phishing cyberattack is conducted using the URL.

17. The system of claim 12, wherein the heuristic logic is configured to performs analytics on each of the one or more code segments by at least conducting one or more filtering operations based on any combination of interactive display filters, layout filters, or error filters.

18. The system of claim 13, wherein the heuristic logic includes one or more layout filters to determine whether a number of advertisements that would be present on the web page upon rendering is less than a first threshold to denote that a code segment of the one or more code segments is suspicious.

19. The system of claim 12, wherein the heuristic logic includes one or more interactive display filters to determine whether a code segment of the one or more code segments includes a displayable element to receive input from a user.

20. The system of claim 12, wherein the heuristic logic includes one or more layout filters to determine whether a number of HTML Document Object Model (DOM) objects included in a code segment of the one or more code segments would be present on the web page upon rendering exceed a first threshold to denote that the code segment is suspicious.

21. A non-transitory storage medium including software that, upon being executed by a processor, performs operations to detect a phishing web page from one or more retrieved code segments associated with a uniform resource locator (URL) under analysis, the non-transitory storage medium comprising:
a first component that, when executed by the processor, parses a first code segment to identify any links within the first code segment;
a second component communicatively coupled to the first component, the second component that, when executed by the processor, acquires one or more code segments, including at the first code segment and one or more additional code segments that are recovered using addressing information from one or more links within the first code segment parsed by the first component;
a third component that, when executed by the processor, performs analytics on each code segment of the one or more code segments to determine whether the code segment is associated with known phishing cyberattack, wherein the third component comprises heuristic logic that performs analytics on each of the one or more code segments; and
fuzzy hash generation and detection logic configured to generate a hash value of the code segment and determine a phishing cyberattack is being conducted in response to a correlation between the hash value and one or more hash values representing code segments associated with known phishing cyberattacks.

* * * * *